United States Patent
Kondou et al.

(10) Patent No.: US 6,519,671 B1
(45) Date of Patent: Feb. 11, 2003

(54) METHOD OF NETWORK CONFIGURATION, METHOD AND APPARATUS FOR INFORMATION PROCESSING, AND COMPUTER-READABLE MEDIA

(75) Inventors: Keitaro Kondou, Kanagawa (JP); Masatoshi Ueno, Tokyo (JP); Kazunobu Toguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/381,748

(22) PCT Filed: Jan. 22, 1999

(86) PCT No.: PCT/JP99/00241

§ 371 (c)(1),
(2), (4) Date: Dec. 27, 1999

(87) PCT Pub. No.: WO99/38291

PCT Pub. Date: Jul. 29, 1999

(30) Foreign Application Priority Data

Jan. 23, 1998 (JP) ............................. 10-011021
Mar. 17, 1998 (JP) ............................. 10-066734

(51) Int. Cl.[7] ................................. G06F 1/00
(52) U.S. Cl. .................. 710/311; 710/310; 710/308; 710/313; 710/110
(58) Field of Search .................. 710/305–306, 710/311–315, 8, 10, 9, 15, 16, 17, 18, 36, 37, 61–63, 72, 73, 104, 107, 110; 709/202, 203, 208, 209, 216, 219, 220–222, 229, 228, 250

(56) References Cited

U.S. PATENT DOCUMENTS

| | | | | |
|---|---|---|---|---|
| 5,724,517 A | * | 3/1998 | Cook et al. | 709/227 |
| 5,751,967 A | * | 5/1998 | Raab et al. | 709/228 |
| 5,761,458 A | * | 6/1998 | Young et al. | 710/307 |
| 5,764,930 A | * | 6/1998 | Staats | 710/107 |
| 5,889,965 A | * | 3/1999 | Wallach et al. | 710/304 |
| 6,038,625 A | * | 3/2000 | Ogino et al. | 710/104 |
| 6,131,119 A | * | 10/2000 | Fukui | 709/224 |
| 6,226,700 B1 | * | 5/2001 | Wandler et al. | 710/300 |
| 6,275,888 B1 | * | 8/2001 | Porterfield | 710/305 |
| 6,332,159 B1 | * | 12/2001 | Hatae et al. | 709/224 |

* cited by examiner

Primary Examiner—Peter Wong
Assistant Examiner—Raymond N Phan
(74) Attorney, Agent, or Firm—Jay H. Maioli

(57) ABSTRACT

A bridge manager (bridge management equipment) is automatically determined. In a network, bridges 51 to 54 are configured by connecting portals 41 to 48 respectively connected to buses 11 to 15 and the different buses 11 to 15 are connected via the bridges 51 to 54. A value denoting the function of the bridge manager managing the portals 41 to 48 and equipment ID are stored in registers in each portal 41 to 48. One bridge manager is selected out of candidates 31 and 34 for a bridge manager based upon a value in the registers.

39 Claims, 20 Drawing Sheets

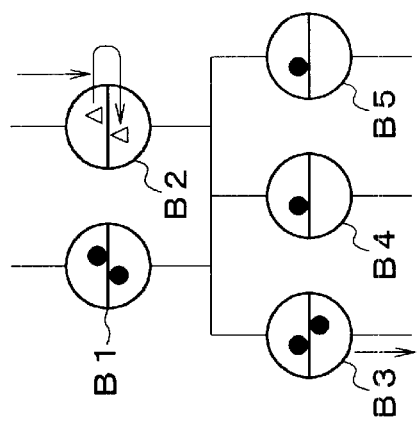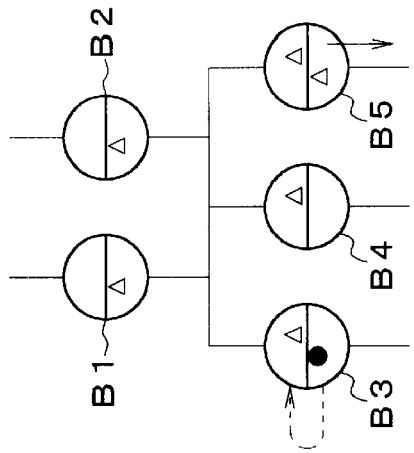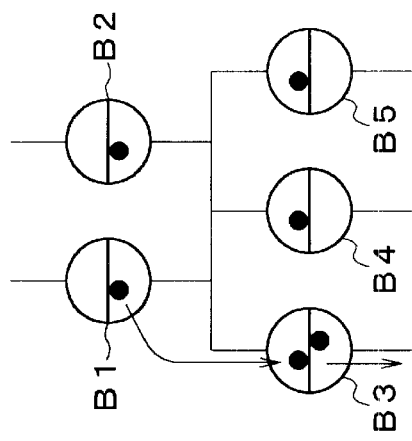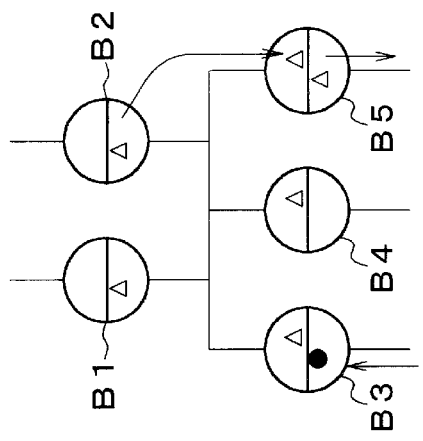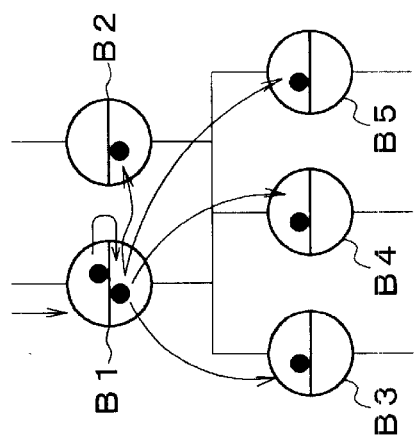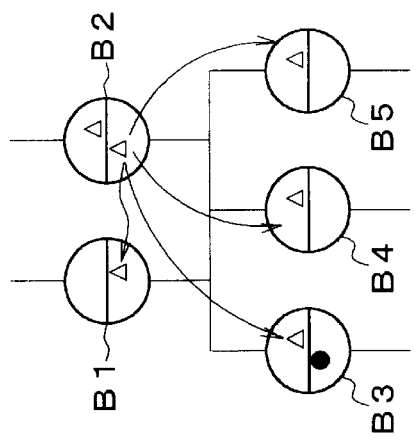

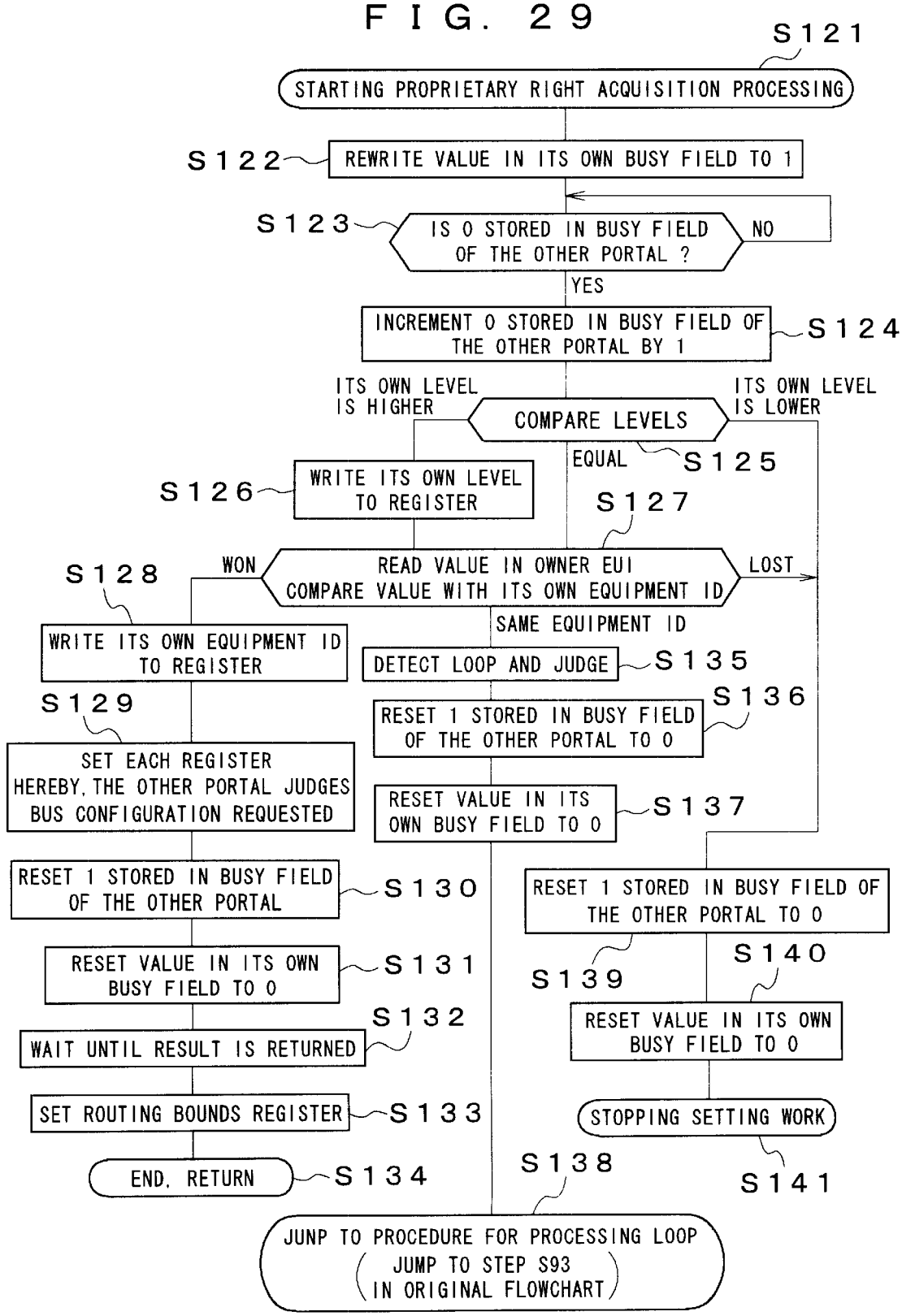

METHOD OF NETWORK CONFIGURATION, METHOD AND APPARATUS FOR INFORMATION PROCESSING, AND COMPUTER-READABLE MEDIA

TECHNICAL FIELD

The present invention relates to a network configuration method for managing a network in which a plural of, for example, en IEEE-1394 serial buses are connected, an information processing method, an information processing unit and a computer readable medium.

BACKGROUND ART

For a digital signal transmission standard, many standards such as standards by International Electrotechnical Commission (IEC) and Institute of Electrical and Electronics Engineers (IEEE) exist. It is noticed that out of these standards, IEEE 1394 is illustratively regarded as suitable for multi-media use such as connection between electronic devices for home use, for example, a digital video recorder and connection between these electronic devices and a computer. As such IEEE 1394 is well known, the description of the contents is omitted.

Currently, in P1394.1 (bridge) working group, the standardization activity of a bridge format in IEEE-1394 environment is performed (as the above activity is described in P1394.1 Draft 0.03 Oct. 18, 1997, the description thereof is omitted). An IEEE-1394 bridge (hereinafter called merely a bridge) is composed of a set of units each called a portal and connected to an IEEE-1394 serial bus (hereinafter suitably abbreviated to a bus), so that data transmission between/among plural buses (two or more) via the bridge is enabled. That is, a number of devices (nodes) which can be connected to one IEEE-1394 serial bus are limited to a maximum of 63, however, further more nodes can be connected by connecting plural buses using the bridges to constitute a network by the buses and the bridges. It is already proposed that data transmission in a bridge (between portals) is performed using not only a cable but also a radio wave, infrared rays and others.

Unique node ID (NODE_ID) is allocated to each equipment, that is, a node, which is connected to a bus. The node ID is composed of bus ID (BUS_ID) denoting a bus to which the node is connected and physical layer ID (PHY_ID, a number of 0 to 63) which is a serial number in the connected bus. Therefore, the bus IDs are allocated to plural buses composing a network without duplication and only one node for functioning as a bridge manager (bridge management equipment) with a function to manage and control the whole network is required.

If in the above network, plural candidates for a bridge manager with a function of a bridge manager exist, there is a problem that one of the candidates cannot be automatically selected as a bridge manager.

The object of the present invention is to enable the automatic determination of a bridge manager out of plural candidates for a bridge manager. Another object of the present invention is to enable the representation in a numeric value of various functions of the equipment as candidates for a bridge manager to compare the various functions, to enable pieces of equipment to read or write information stored in two different storage areas even in the conflict therebetween and further, to enable selecting further multi-function equipment, equipment faster in processing speed and others preferentially when a bridge manager is determined.

DISCLOSURE OF INVENTION

A network configuration method according to the present invention is a network configuration method for managing a network in which a bridge is configured by connecting devices respectively connected to different buses and the different buses are connected via the bridge, characterized in that, in the device configuring the bridge, information owned by bridge management equipment managing the device is stored, and a piece of equipment is selected as bridge management equipment, based upon the information stored in the device configuring the bridge, among pieces of equipment which can manage the whole network.

Also, an information processing method according to the present invention is the information processing method of an information processing unit provided with functions which can manage a network in which a bridge is configured by connecting devices respectively connected to different buses and the different buses are connected via the bridge, characterized in that the above information processing method is provided with a processing step for judging whether it is selected as bridge management equipment or not based upon a result of the comparison between information which a device configuring the bridge stores, the information being owned by the bridge management equipment managing the device, and its own information.

Also, an information processing unit according to the present invention is an information processing unit provided with functions which can manage a network in which a bridge is configured by connecting devices respectively connected to different buses and the different buses are connected via the bridge, characterized in that the above information processing unit is provided with processing means for judging whether it is selected as bridge management device or not based upon a result of comparison between information which the device configuring the bridge stores, the information being owned by the bridge management equipment managing the device, and its own information.

Also, an information processing method according to the present invention is the information processing method of an information processing unit provided with a function as a bridge for connecting different buses, characterized in that the information processing method is provided with a storing step for storing information owned by bridge management equipment managing the bridge.

Also, an information processing unit according to the present invention is an information processing unit provided with a function as a bridge for connecting different buses, characterized in that the information processing unit is provided with storage means for storing information owned by bridge management equipment managing a bridge it owns.

Also, an information processing method according to the present invention is the information processing method of an information processing unit connected to a network in which a bridge is configured by connecting devices respectively connected to different buses and the different buses are connected via the bridge, characterized in that the above information processing method is provided with a step for setting a flag denoting an access right to a group of registers for storing information related to the setting of the bridge.

Also, an information processing unit according to the present invention is an information processing unit connected to a network in which a bridge is configured by connecting devices respectively connected to different buses and the different buses are connected via the bridge, characterized in that the information processing unit is provided with setting means for setting a flag denoting an access right to a group of registers for storing information related to the setting of the bridge.

Also, an information processing method according to the present invention is the information processing method of an information processing unit connected to a network in which a bridge is configured by connecting devices respectively connected to different buses and the different buses are connected via the bridge, characterized in that the information processing method comprises a step for referring to a flag denoting an access right stored in another equipment and a step for judging whether the above another equipment is accessed or not based upon the flag.

Also, an information processing unit according to the present invention is an information processing unit connected to a network in which a bridge is configured by connecting devices respectively connected to different buses and the different buses are connected via the bridge, characterized in that the above information processing unit comprises reference means for referring to a flag denoting an access right stored in another equipment and judging means for judging whether the above another equipment is accessed or not based upon the flag.

Also, a computer readable medium according to the present invention records a program for realizing the network configuration method, the information processing method and the information processing unit respectively according to the present invention.

BRIEF DESCRIPTION OF DRAWINGS

FIGS. 15A to 15F are illustrations for explaining bridge manager determining processing by the second bridge manager determining method;

FIG. 29 is a flowchart showing a procedure of processing for setting a portal in the bridge configuration processing in the second bridge manager determining method;

BEST MODE FOR CARRYING OUT THE INVENTION

Figure 1:
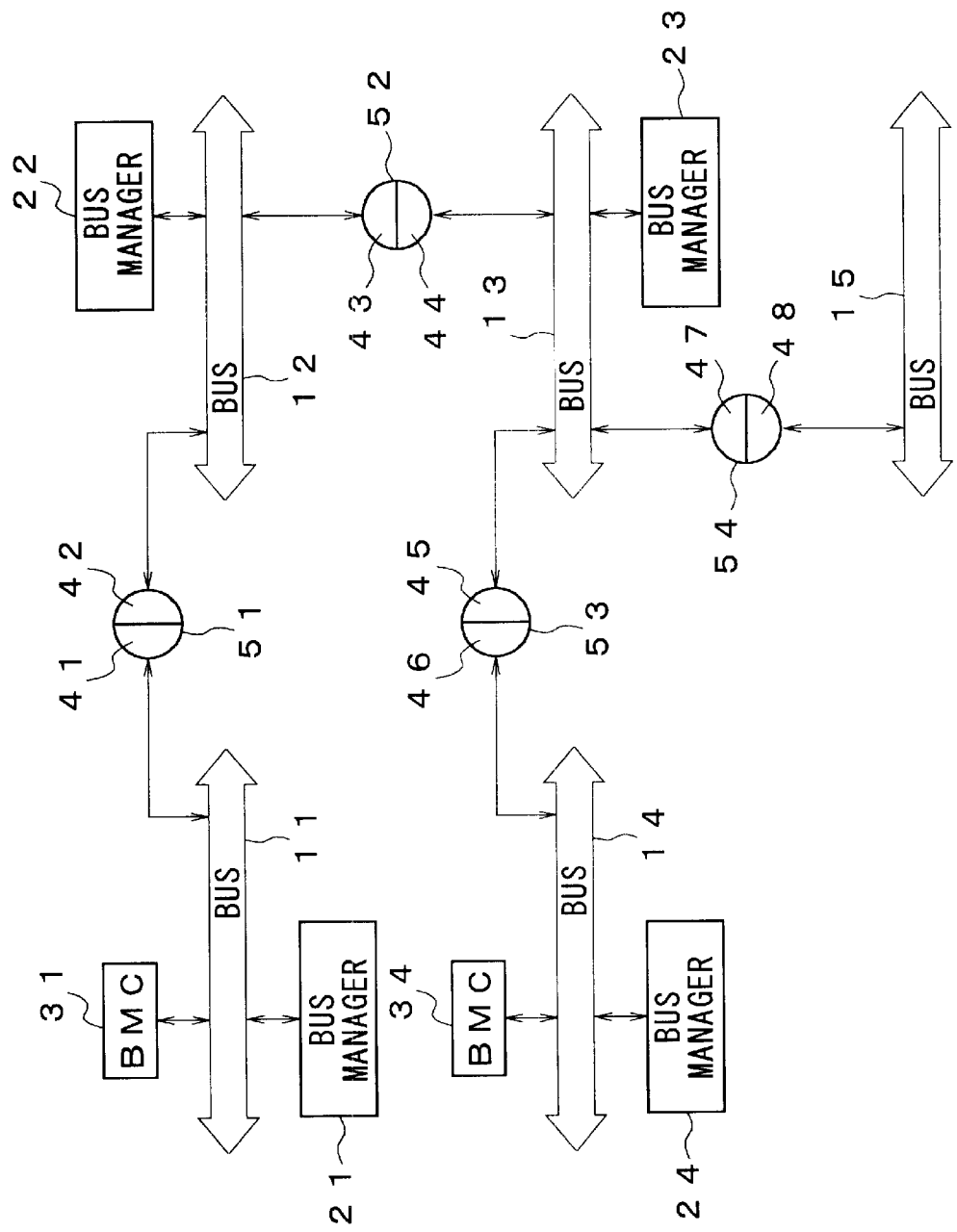
FIG. 1 is an illustration showing the schematic configuration of a network system according to an embodiment of the invention.

FIG. 1 shows the configuration of a network system as an embodiment of the invention. The network system configures an IEEE-1394 serial network and is composed of IEEE-1394 serial buses and bridges connecting them.

As shown in FIG. 1, buses 11 to 15 (hereinafter described only a bus in case the buses 11 to 15 are not particularly required to be distinguished) are IEEE-1394 serial buses and the most 63 pieces of nodes can be connected to each bus.

Node ID is composed of bus ID (BUS_ID: 10 bits) denoting a bus to which a node is connected and physical layer ID (PHY_ID: 6 bits) which is a serial number in a bus. Therefore, the maximum number of buses connected in the network is 1023. The bus ID of each of the unset nodes (for example, when power is turned on) is set to an initial value (3FF). Unique equipment ID is allocated to any node beforehand separately from the node ID.

Candidates for a bridge manager (BMC) 31 and 34 (hereinafter described only a candidate for a bridge manager in case the candidates for a bridge manager 31 and 34 are not particularly required to be distinguished) are provided with a function as a bridge manger for managing and controlling the whole IEEE-1394 serial network system. One of the candidates for a bridge manager 31 and 34 is automatically determined as a bridge manager by executing the same processing according to predetermined regulations described later. The candidate for a bridge manager informs all nodes under its control of its own equipment ID.

A portal 41 connected to the bus 11 configures a bridge 51 together with a portal 42 connected to the bus 12, whereby the buses 11 and 12 are connected to receive or send a data packet therethrough. A portal 43 connected to the bus 12 configures a bridge 52 together with a portal 44 connected to the bus 13, whereby the buses 12 and 13 are connected to receive or send a data packet therethrough. Further, a portal 45 connected to the bus 13 configures a bridge 53 together with a portal 46 connected to the bus 14, whereby the buses 13 and 14 are connected to receive or send a data packet therethrough. Similarly, a portal 47 connected to the bus 13 configures a bridge 54 together with a portal 48 connected to the bus 15, whereby the buses 13 and 15 are connected to receive or send a data packet therethrough.

Figure 2:
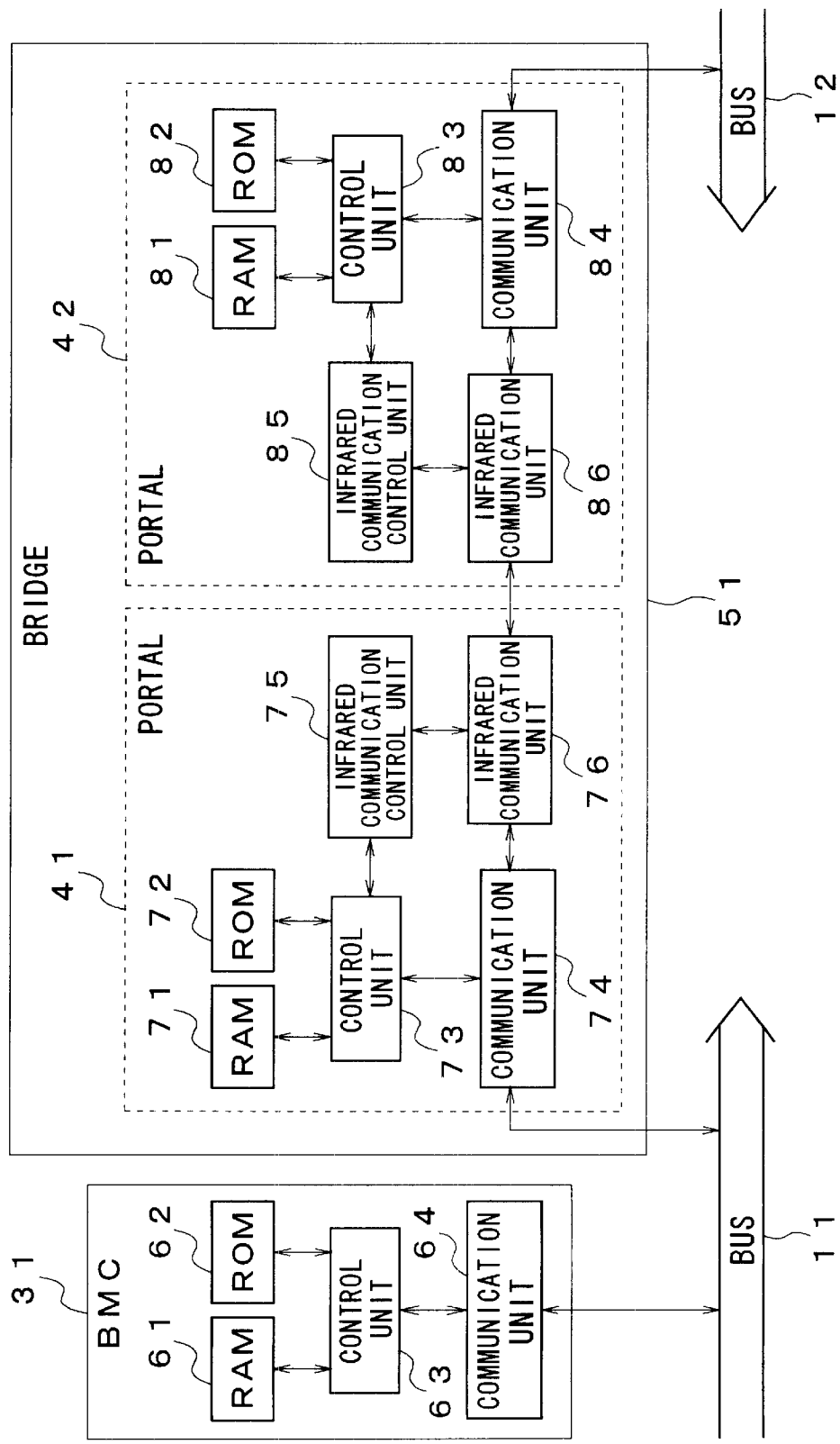
FIG. 2 is a block diagram showing the details of a bridge in the network system.

Referring to FIG. 2, the detailed configuration of the candidate for a bridge manager 31 and the bridge 51 respectively shown in FIG. 1 as an example will be described below.

As shown in FIG. 2, a communication unit 64 of the candidate for a bridge manager 31 receives or sends a data packet from/to the bus 11. A control unit 63 controls the whole candidate for a bridge manager 31. RAM 61 is a register for storing the node ID and others of the candidate for a bridge manager 31. ROM 62 stores a computer program to be used by the control unit 63, the equipment ID of the candidate for a bridge manager 31 and a level thereof described later. As the configuration of the candidate for a bridge manager 34 is similar to that of the candidate for a bridge manager 31, the description thereof is omitted.

A communication unit 74 in the portal 41 configuring the bridge 51 receives or sends a data packet from/to the bus 11 or an infrared communication unit 76. A control unit 73 controls the whole portal 41. RAM 71 includes each register described later such as PORTAL_CONTROL register for storing the node ID, maximum bus ID (MAX_BUS_ID) and others of the corresponding portal 41, a bridge manager level register for storing the level of a bridge manager that manages the portal 41. As maximum bus ID is well known, the description thereof is omitted. ROM 72 stores a computer program to be used by the control unit 73. An infrared communication control unit 75 controls the infrared communication unit 76 for receiving or sending a data packet from/to the portal 42 by infrared rays.

Similarly, a communication unit 84 in the portal 42 configuring the bridge 51 receives or sends a data packet from/to the bus 12 or an infrared communication unit 86. A control unit 83 controls the whole portal 42. RAM 81 includes each register described later. ROM 82 stores a computer program to be used by the control unit 83. An infrared communication control unit 85 controls the infrared communication unit 86 for receiving or sending a data packet from/to the portal 41 by infrared rays.

The configuration of each portal 43 to 48 is similar to that of each portal 41 and 42. Therefore, as the configuration of each bridge 52 to 54 is similar to that of the bridge 51, the description thereof is omitted.

As described above, the two portals configuring the bridge are operated as a node of the IEEE-1394 serial buses and the bridge can connect the two buses by connecting the two portals to the different buses. According to IEEE 1394, by including such a concept of a bridge, one network in which the maximum of 1023 buses is connected can be configured.

Only one bridge manager exists in one network and manages the network.

In the present invention, a method of automatically determining one bridge manager out of plural candidates for a bridge manager is proposed. It is conceivable that one bridge manager is automatically selected out of plural candidates for bridge managers based upon one parameter (equipment ID) stored in a portal and further, one bridge manager provided with a higher function is automatically selected out of plural candidates for a bridge manager.

As a concrete example of the above determination of a bridge manager, first and second bridge manager determining methods shown in FIGS. 3 and 4 will be described below.

Figure 3:
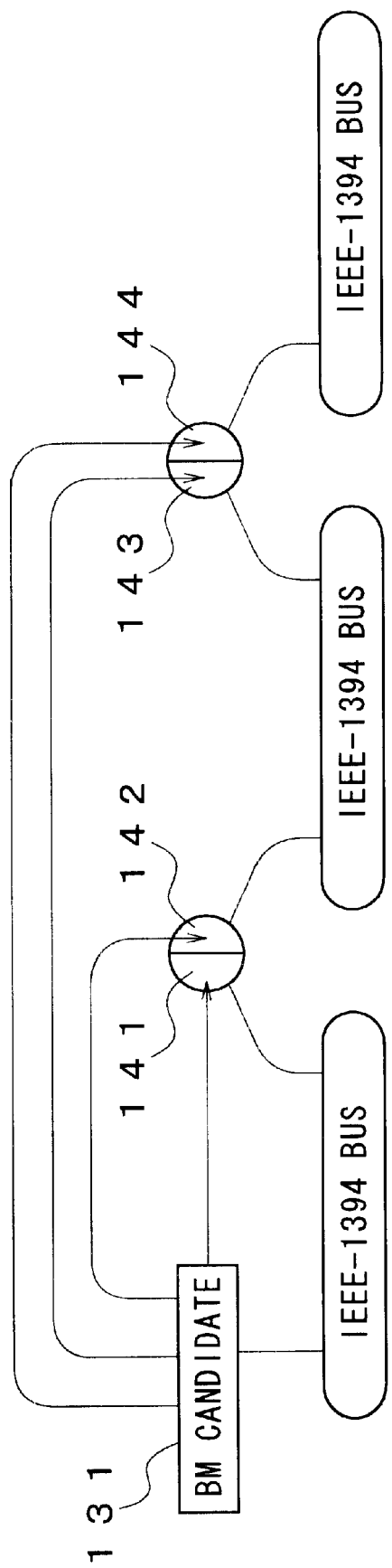
FIG. 3 is an illustration for explaining a first method of determining a bridge manager.

That is, the first bridge manager determining method shown in FIG. 3 is a method that a candidate for a bridge manager 131 configures a network while it sequentially sets all portals 141, 142, 143 and 144, and finally, a network managed by one bridge manager is configured.

Figure 4:
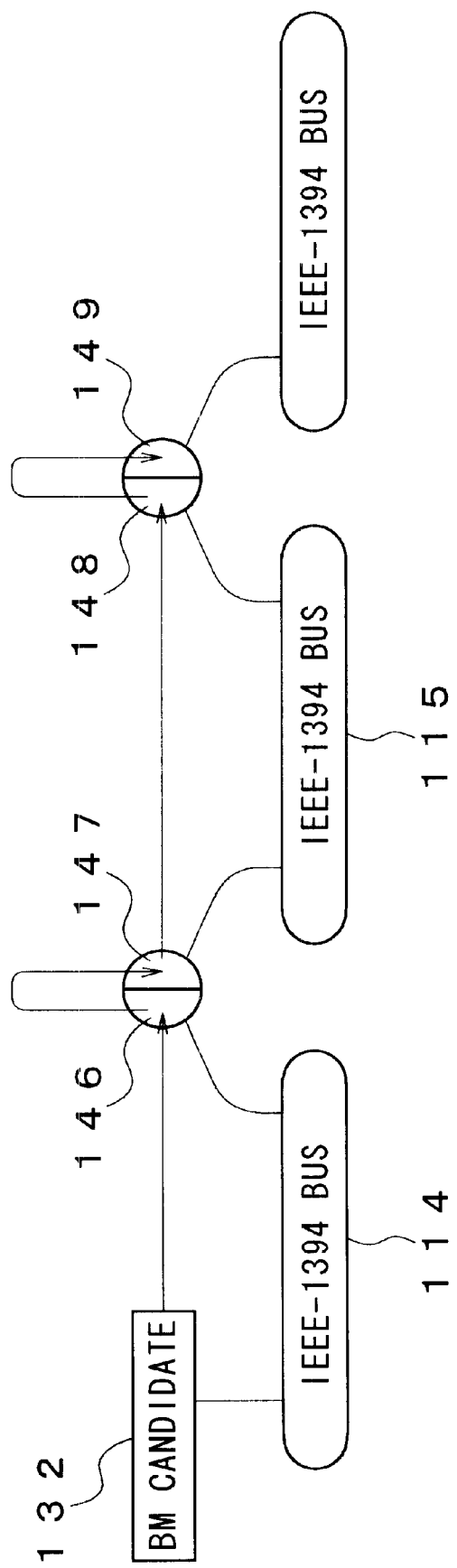
FIG. 4 is an illustration for explaining a second method of determining a bridge manager.

Also, the second bridge manager determining method shown in FIG. 4 is a method such that a candidate for a bridge manager 132 first requests a portal 146 on its own bus 114 to configure a network in front of the portal 146, the requested portal 146 requests a portal 147 to configure a network in front of the portal 147, further, the portal 147 requests a portal 148 on the bus 115 to configure a network in front of the portal 148, the requested portal 148 requests a portal 149 to configure a network in front of the portal 149 and finally, a network managed by one bridge manager is configured.

The flow when a network is actually configured in the network system shown in FIG. 1 will be described below. First, the flow of network configuration in a bridge manager concentralized setting method in which a program run by the bridge manager sets all portals, that is, in the above first bridge manager determining method will be described below. In this example, one bridge manager is automatically selected out of plural candidates for a bridge manager based upon one parameter (equipment ID) stored in a portal.

To explain rough flow in the first bridge manager determining method, first, a candidate for a bridge manager resets maximum bus ID (MAX_BUS_ID) which is an internal variable to zero, next, starts the configuration of a bus (a local bus) to which the candidate for a bridge manager is connected and further, sets itself to a bridge manager when bus configuration is finished (at this time, the setting of all portals is finished). However, when the processing is stopped on the way of the bus configuration, the candidate for a bridge manager ceases being a candidate for a bridge manager. When the candidate for a bridge manager is selected as a bridge manager as described above, it informs the whole network of its own node ID (NODE_ID) and terminates its processing.

Figure 5:
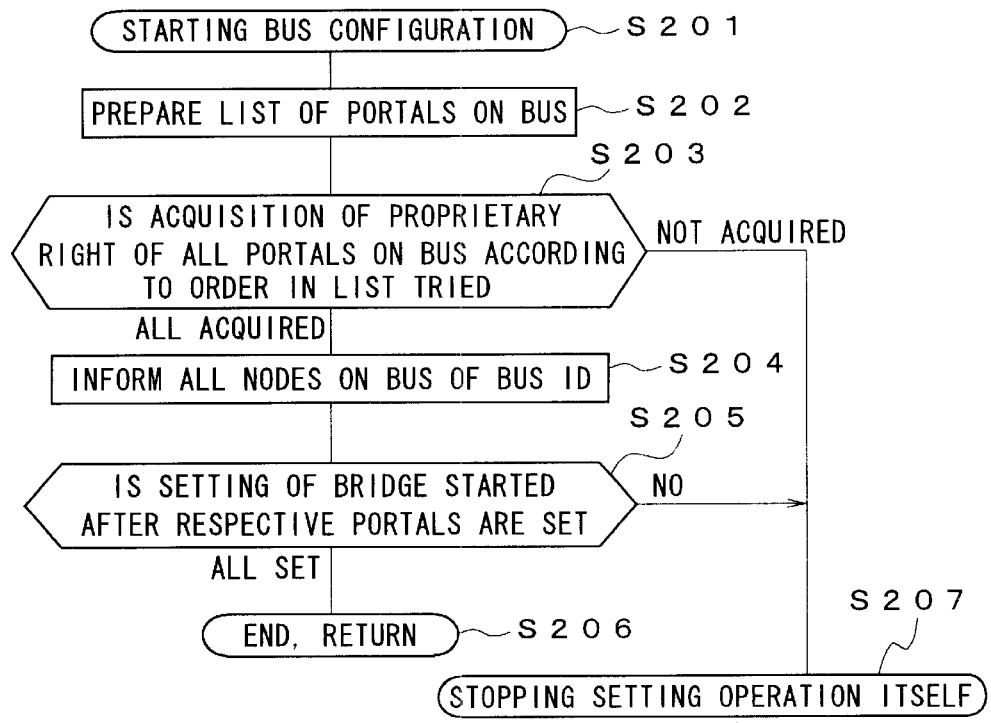
FIG. 5 is a flowchart showing a procedure of bus configuration processing in the first bridge manager determining method.

A flowchart shown in FIG. 5 shows a procedure of the above bus configuration.

As shown in FIG. 5, bus configuration is started in a step S201. Next, in a step S202, a list of portals on a local bus to which the corresponding candidate for a bridge manager is connected is prepared and the portals are sorted in the order of equipment ID. The list in the order of equipment ID is an example to fix order so that a list can be also prepared in another order.

Next, in a step S203, the candidate for a bridge manager first tries to acquire the proprietary right of all portals on the local bus according to the order in the list. A flowchart shown in FIG. 6 shows a procedure of operation for acquiring the proprietary right of all portals by the candidate for a bridge manager in the step S203.

Figure 6:
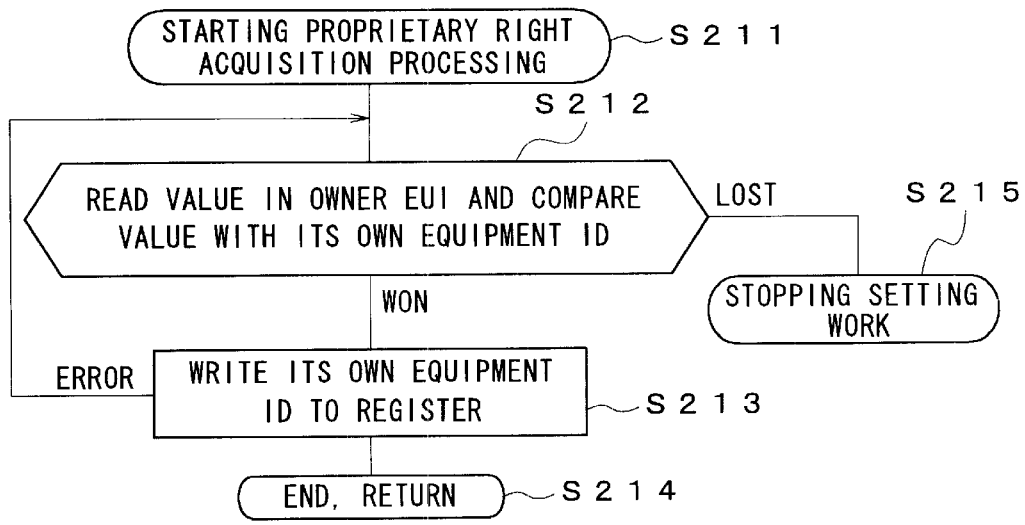
FIG. 6 is a flowchart showing a procedure of processing for obtaining the proprietary right of a portal in the bus configuration processing in the first bridge manager determining method.

As shown in FIG. 6, in a step S211, the acquisition of the proprietary right is started. After the step S211, the processing proceeds to a step S212. In the step S212, a value (equipment ID) stored in OWNER EUI register of a portal to be acquired is read and compared with equipment ID stored in its own OWNER EUI register. If the equipment ID thereof is stronger (wins) in the comparison, the processing proceeds to a step S213.

In the step S213, the equipment ID of the candidate is written to OWNER EUI register of the portal. As a result, the proprietary right is acquired. The above writing is executed using "compare and swap" processing in a lock transaction in IEEE 1394 and when an error occurs, the processing is returned to the step S212. After the proprietary right is acquired by the above writing, the processing proceeds to a step S214 and acquiring operation normally terminates.

When the equipment ID of the candidate is weaker (loses) in the comparison in the step S212, the processing proceeds to a step S215 wherein setting operation itself stops. Hereby, this candidate is excluded from candidates for a bridge manager.

After the processing in the step S203 shown in FIG. 5 in which the same procedure as that in the flowchart shown in FIG. 6 is executed, the processing proceeds to a step S204. In the step S204, the value of maximum bus ID is written to a bus ID field of the node ID register of all nodes. At this time, a broadcast in a write transaction in IEEE 1394 is used.

In a step S205, the candidate for a bridge manager sets all portals in the list according to the order in the list. Concretely, the above setting is performed according to a procedure in a flowchart shown in FIG. 7.

Figure 7:
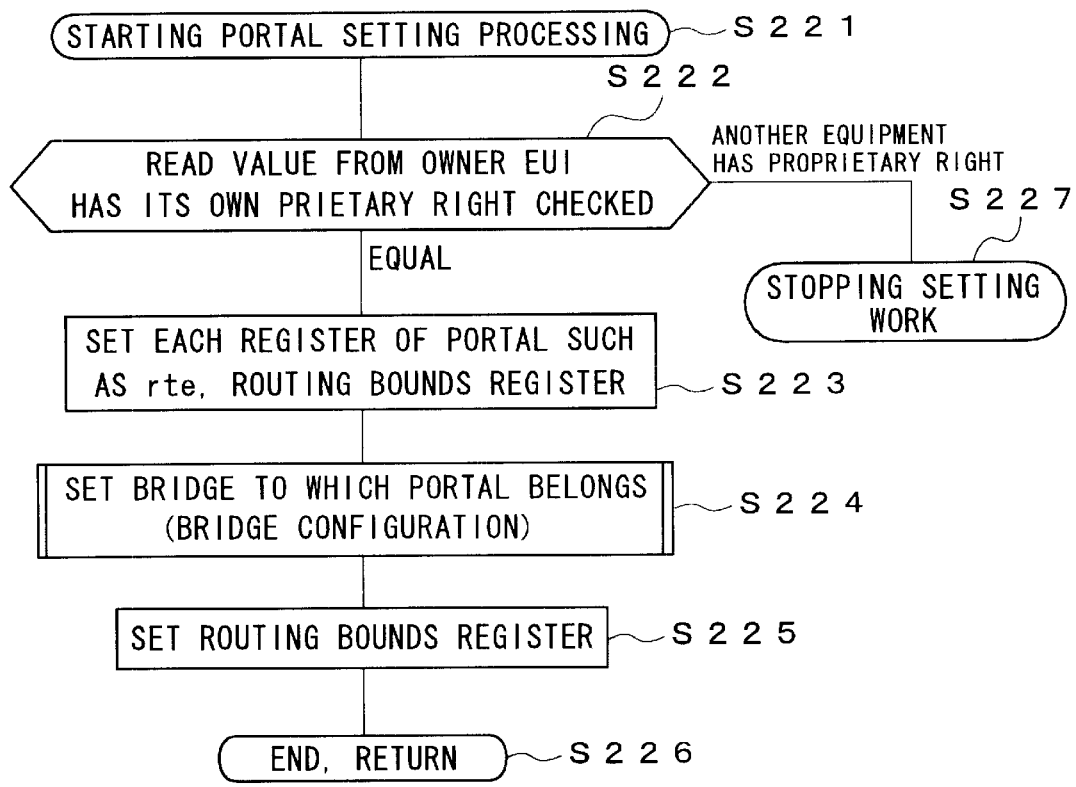
FIG. 7 is a flowchart showing a procedure of processing for setting a portal in the bus configuration processing in the first bridge manager determining method.

As shown in FIG. 7, in a step S221, the setting of a portal is started. After the step S221, the processing proceeds to a step S222. In the step S222, a value (equipment ID) stored in OWNER EUI register is read and it is checked whether the value is equal to equipment ID stored in its own OWNER EUI register or not. When they are equal, the processing proceeds to a step S223.

In the step S223, each register of the portal is set. The value of maximum bus ID, which is an internal variable of the candidate itself, is incremented by 1 and 2 are written to "rte" field of PORTAL CONTROL register. Further, information required when an IEEE-1394 network is configured is set such as the value of maximum bus ID (max_bus_ID) is written to a lower bound field of ROUTING BOUNDS register.

Further, the processing proceeds to a step S224. In the step S224, a bridge including set portals is set. In this case, a procedure of bridge configuration described later is executed. Afterward, the processing proceeds to a step S225 wherein the value of maximum bus ID is written to an upper bound filed in ROUTING BOUNDS register, and the processing proceeds to a step S226 wherein the portal setting processing terminates.

In the above check of the proprietary right in the step S222, when equipment ID is different and another equipment has the proprietary right, the processing proceeds to a step S227 wherein setting operation itself stops. Hereby, the candidate is excluded from candidates for a bridge manager.

After the processing in the step S205 shown in FIG. 5, in which the same procedure as that in the flowchart shown in FIG. 7 is executed, the processing proceeds to a step S206 shown in FIG. 5. In the step S206, bus configuration is normally completed.

In the meantime, when the proprietary right of all portals cannot be acquired in the step S203 or when all portals cannot be set in the step S205, the processing proceeds to a step S207 wherein setting operation itself stops and the candidate is excluded from candidates for a bridge manager.

Next, referring to a flowchart shown in FIG. 8, a procedure of bridge configuration will be described.

A bridge includes two portals and the setting of one portal (this is called a portal A in the following description) is already finished. Therefore, as merely the other portal has only to be set, the acquisition of the proprietary right and the setting are performed once.

Figure 8:
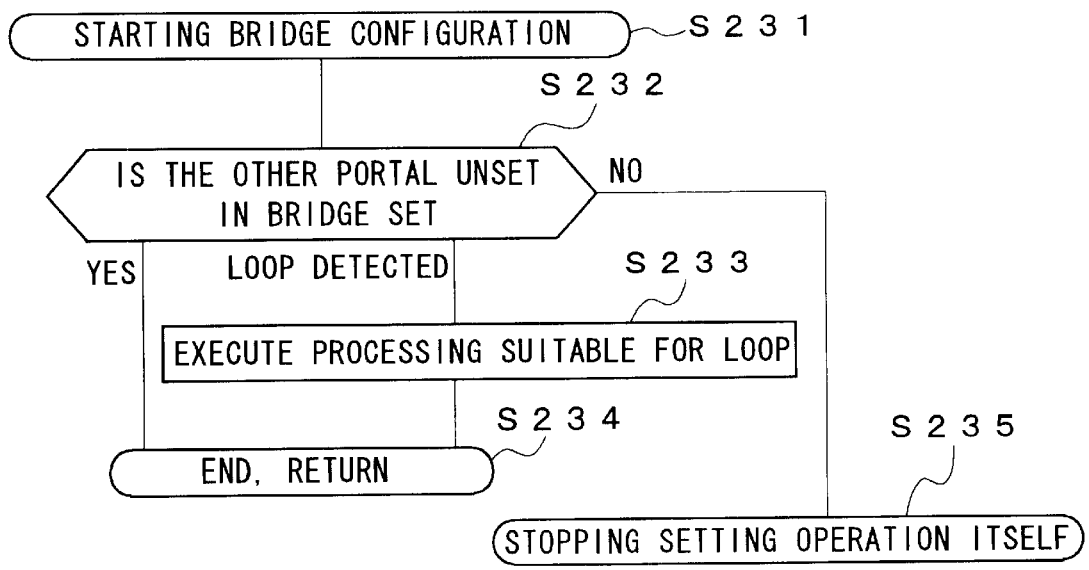
FIG. 8 is a flowchart showing a procedure of bridge configuration processing in the first bridge manager determining method.

In a step S231 shown in FIG. 8, bridge configuration is started. In a step S232, the setting of the unset portal in the bridge is started. A procedure in the step S232 is shown in a flowchart shown in FIG. 9.

Figure 9:
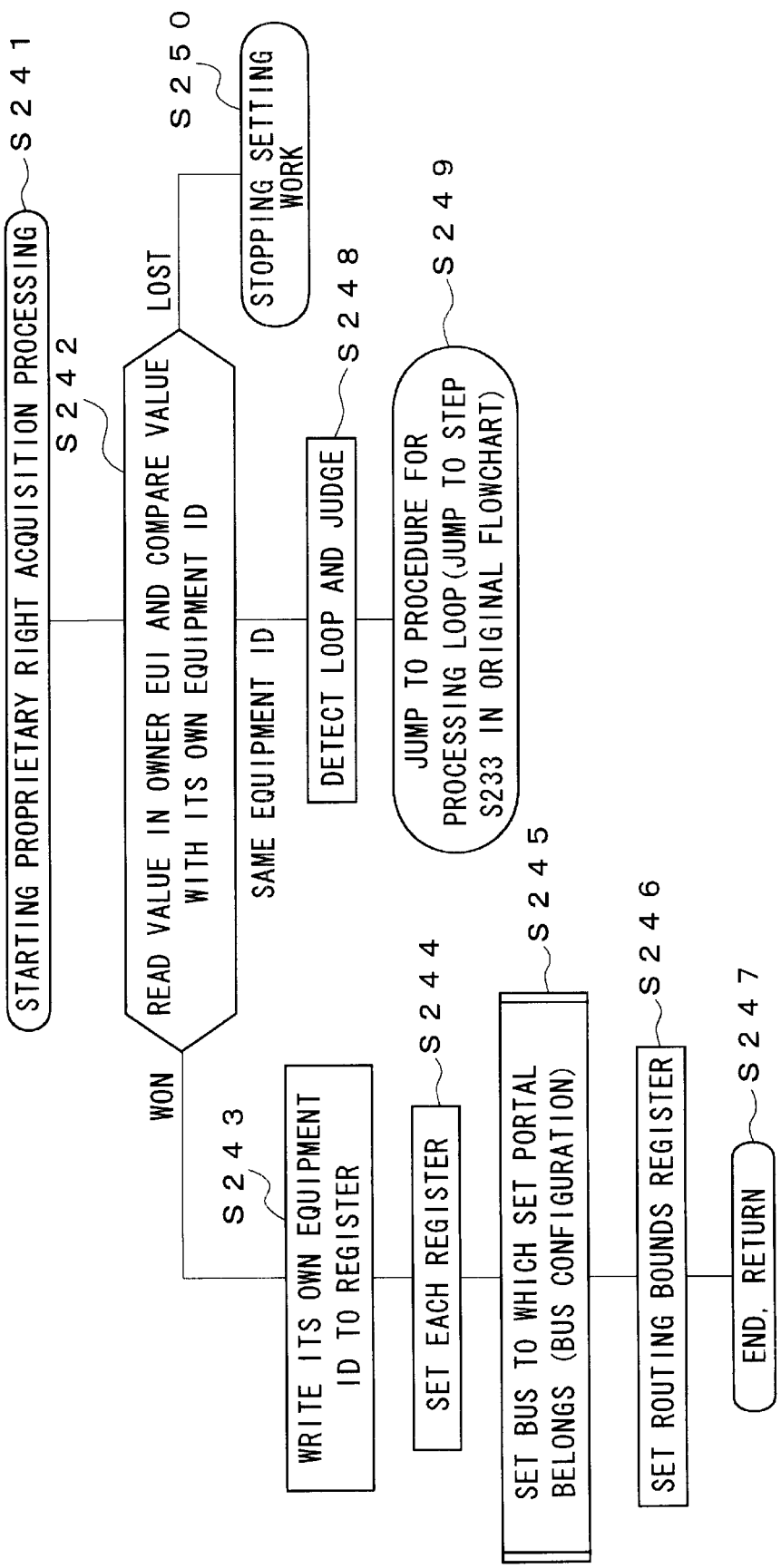
FIG. 9 is a flowchart showing a procedure of processing for setting a portal in the bridge configuration processing in the first bridge manager determining method.

In a step S241 shown in FIG. 9, the acquisition of the proprietary right of the portal is started. After the step S241, the processing proceeds to a step S242. In the step S242, a value (equipment ID) stored in OWNER EUI register is read and compared with equipment ID stored in its own OWNER EUI register. When the equipment ID thereof is stronger (wins), the processing proceeds to a step S243.

In the step S243, the equipment ID of the candidate itself is written to the OWNER EUI register. Hereby, the proprietary right is acquired. In a step S244, each register in the portal is set. That is, 3 are written to "rte" field of PORTAL CONTROL register. Further, information required when an IEEE-1394 network is configured is set such as the value of maximum bus ID (MAX_$BUS$_ID) is written to the lower bound field of ROUTING BOUNDS register.

After the processing in the step S244, the processing proceeds to a step S245. In the step S245, a bus including the set portal is set. In this case, a procedure of bus configuration is executed. Afterward, in a step S246, the value of maximum bus ID is written to the upper bound field of ROUTING BOUNDS register and in a step S247, the processing normally terminates.

When equipment ID is equal in the step S242, the processing proceeds to a step S248. The equality of equipment ID means that the network is looped and therefore, in the step S248, it is judged that the network is looped. In a step S249, the processing proceeds to a step S233 shown in FIG. 8.

When the equipment ID of the candidate is weaker (loses) in the step S242, the processing proceeds to a step S250. In the step S250, the setting stops and the candidate is excluded from candidates for a bridge manager.

After the processing in the step S232 shown in FIG. 8, in which the same procedure as that of a flowchart shown in FIG. 9 is executed, the processing proceeds to any of steps S233, S234 and S235 shown in FIG. 8. In the step S233, the value of the portal A already set in "rte" field of PORTAL CONTROL register is reset to zero (this is equivalent to disconnection between the portals). In the step S234, as the portal is set, the bridge configuration is finished. In the meantime, in the step S235, the setting operation itself is stopped.

Next, the flow of network configuration in a distributed network setting method in which each portal executes predetermined operation, that is, in the above second bridge manager determining method will be described below. In this case, one bridge manager is also automatically selected out of plural candidates for a bridge manager based upon one parameter (equipment ID) stored in a portal.

As rough flow in the second bridge manager determining method, first, a portal checks the rewritten contents of each register in case each register is rewritten and afterward, the portal judges based upon the type and the value of the rewritten register and a state of the portal itself, and rewrites a state of the portal.

Figure 10:
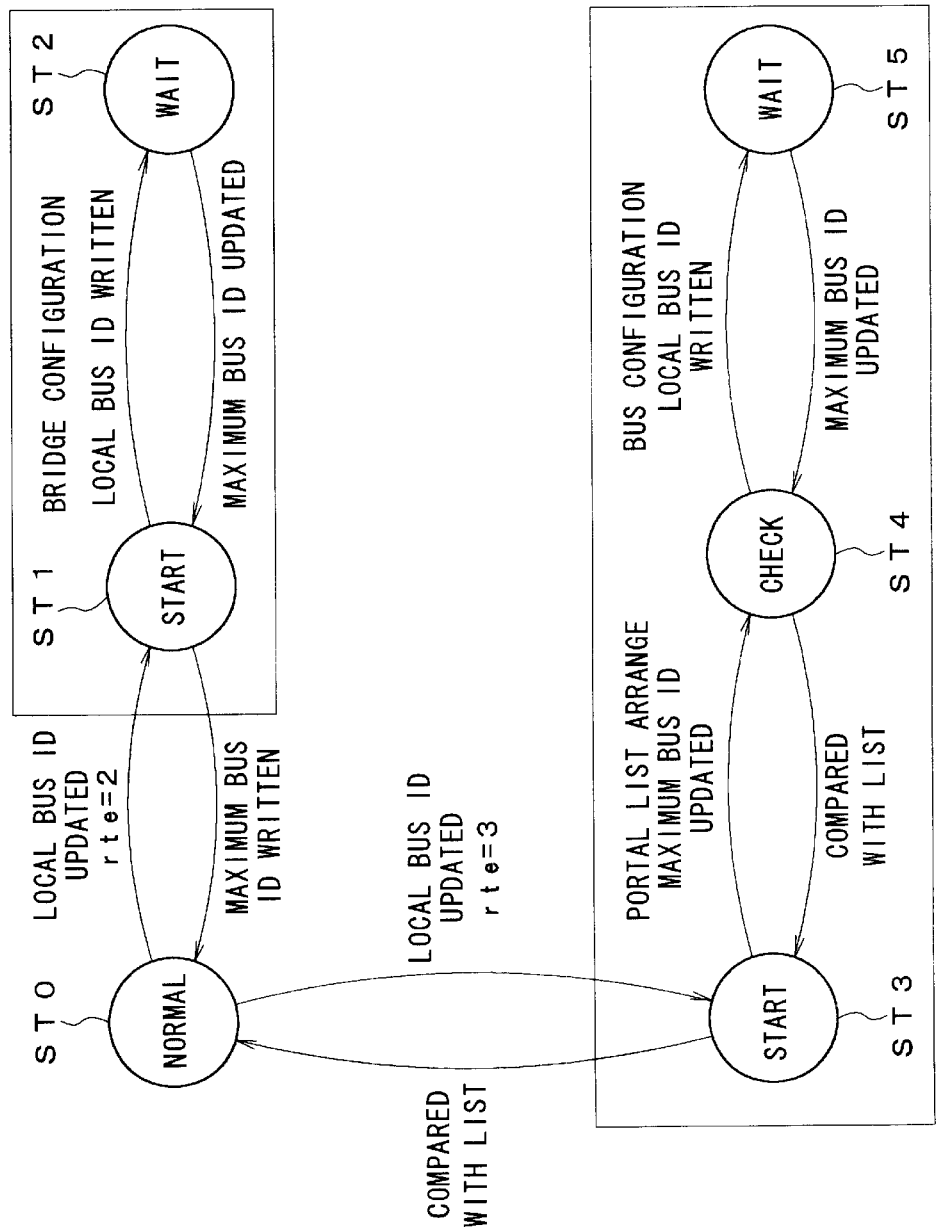
FIG. 10 is a state transition diagram of a portal.

The above transition of a state can be illustrated as shown in FIG. 10. Each STO to ST5 in FIG. 10 show a state and an arrow from a state to another state shows the transition of a state. As shown in FIG. 10, if LOCAL BUS ID register is updated, any state changes to the state ST1 or ST3 (depending upon a value in the "rte" field). If OWNER EUI register is rewritten, any state also changes to the state STO.

Next, a node that is provided with a function as a bridge manager starts setting operation as follows:

(1) The node resets its own MAX BUS ID register to zero;
(2) The node applies a procedure of bus configuration to its own bus;
(3) If bus configuration is normally terminated, the node informs the whole network of its own node ID as ID of a bridge manager; and
(4) Afterward, the node terminates setting operation.

A word of a request for setting to a portal is used in the following two cases. That is, the above two cases are a request for bridge configuration and a request for bus configuration. After all, when writing to a determined register is performed, a written portal judges what is requested and starts related processing.

Equipment which requests a portal to set waits until a result from the portal is returned. It is judged by MAX BUS ID register of the equipment rewritten by the portal whether the result is returned or not.

A fact that a result is not returned means that the setting is stopped in front of a portal which is requested to set and the fact occurs in case a more suitable candidate for a bridge manager exists.

Figure 11:
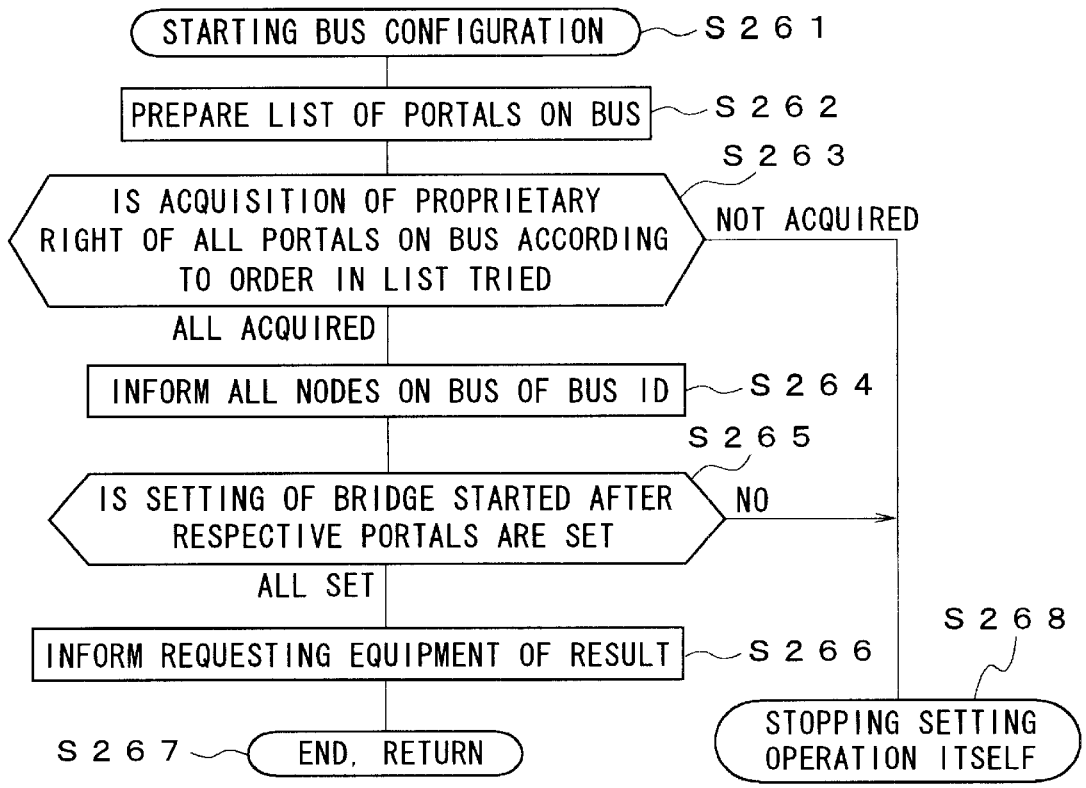
FIG. 11 is a flowchart showing a procedure of bus configuration processing in the second bridge manager determining method.
Figure 13:
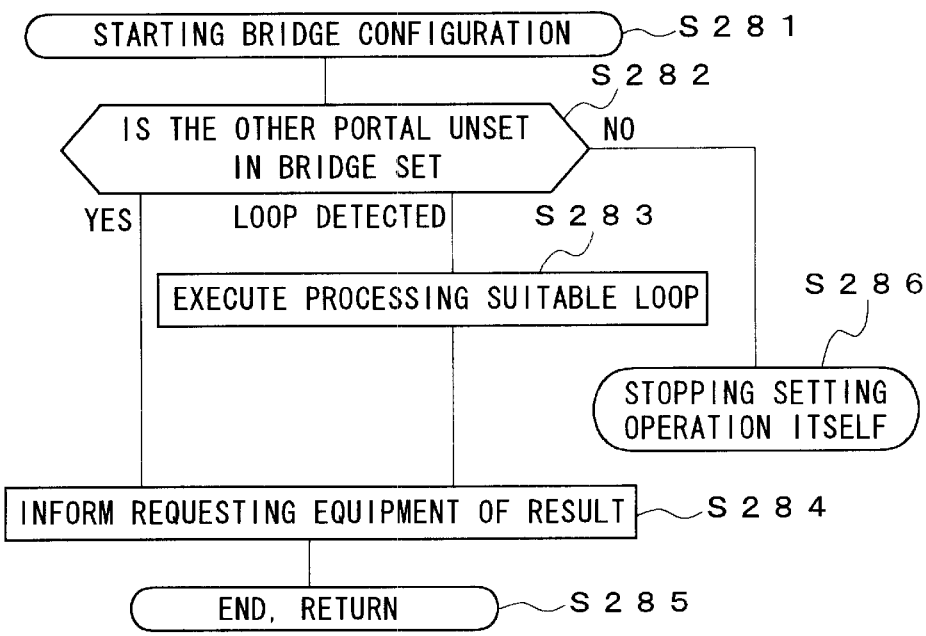
FIG. 13 is a flowchart showing a procedure of bridge configuration processing in the second bridge manager determining method.

Each procedure of bus configuration and bridge configuration is respectively shown in FIGS. 11 and 13 and each procedure is approximately the same as that in the first bridge manager determining method, however, the operator of setting operation is different.

A flowchart of bus configuration shown in FIG. 11 will be described below. In the following description, equipment (a portal) which is requested to set a bus is particularly called an "invoker" to distinguish it from another portal.

As shown in FIG. 11, in a step S261, the invoker starts the setting of a bus. In a step S262, the invoker prepares a list of portals on a local bus where the invoker exists and sorts them in the order of equipment ID. The list in the order of equipment ID is an example to fix order and a list may be also prepared in another order.

In a step S263, the invoker first acquires the proprietary right of all portals according to the order in the list. At this time, the invoker applies the above processing in the flowchart shown in FIG. 6 to each portal.

Next, in a step S264, the invoker broadcasts bus ID recorded in LOCAL BUS ID register to the bus to which the invoker belongs. In a step S265, the invoker first reads a bus ID field of its own LOCAL BUS ID register and writes the value to its own MAX BUS ID register. Hereby, the invoker sets portals while checking a proprietary right according to the order in the list again.

Figure 12:
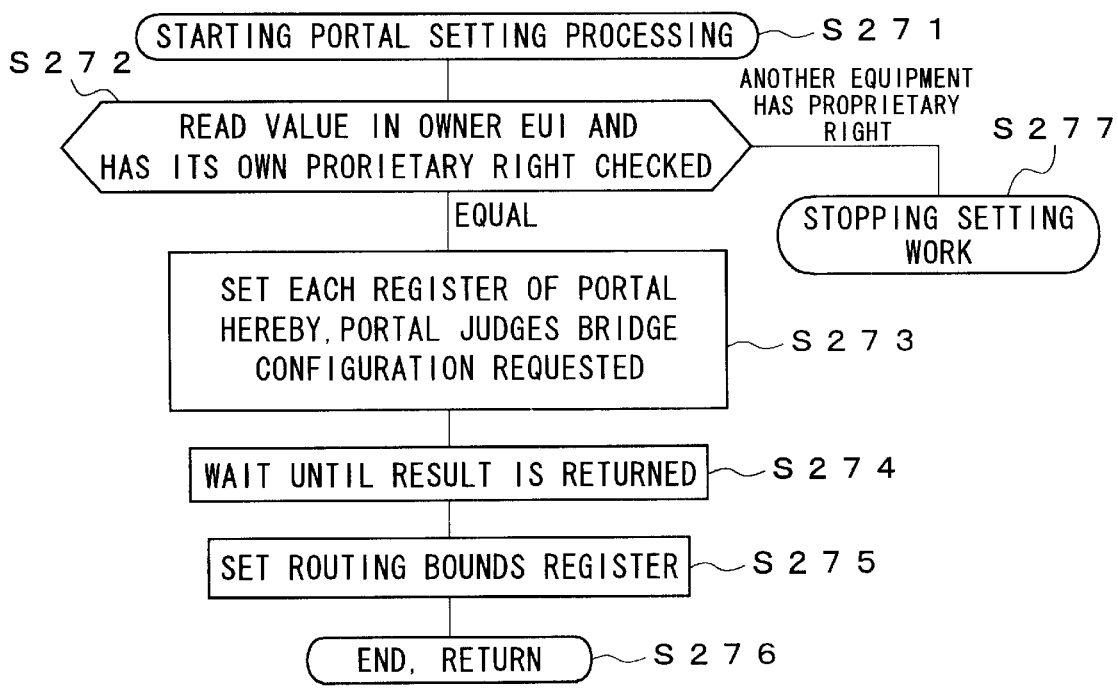
FIG. 12 is a flowchart showing a procedure of processing for setting a portal in the bus configuration processing in the second bridge manager determining method.

In the processing in the step S265, the invoker applies the processing in the flowchart shown in FIG. 2 to each portal. As shown in FIG. 12, in a step S271, the setting of a portal is started. After the step S271, the processing proceeds to a step S272. In the step S272, a value (equipment ID) stored in OWNER EUI register is read and it is checked whether the equipment ID is equal to equipment ID stored in OWNER EUI register of the invoker itself or not. When they are equal, the processing proceeds to a step S273.

In the step S273, each register of the portal is set. First, information required when an IEEE-1394 network is configured is set. Concretely, 2 are written to "rte" field of PORTAL CONTROL register and a value acquired by adding one to a value stored in its own MAX BUS ID register is written to a lower bound register in ROUTING BOUNDS register. Next, registers are set as follows to request the portal to do bridge configuration. That is, its own node ID is written to UPPER PORTAL ID register, a value acquired by adding one to the value of its own MAX BUS ID register is written to MAX BUS ID register and the bus ID of a bus to which the portal belongs is written to the bus ID field of LOCAL BUS ID register.

Next, in a step S274, the invoker waits until a value stored in its own MAX BUS ID register is updated. Afterward, in a step S275, a value stored in its own MAX BUS ID register is written to an upper bound field of ROUTING BOUNDS register. In a step S276, portal setting processing terminates and the processing is returned to the original processing.

In the check of the proprietary right in the step S272, when equipment ID is different and another equipment has a proprietary right, the processing proceeds to a step S277 and setting operation itself stops.

In the processing in the step S265 shown in FIG. 11, in which the same procedure as that of the flowchart shown in FIG. 12 is executed, when all can be set, the processing proceeds to a step S266 and when setting fails, the processing proceeds to a step S268.

In the step S266, the invoker reads upper portal ID from its own UPPER PORTAL ID register and writes the contents of its own MAX BUS ID register to MAX BUS ID register of an upper portal. However, before that, the invoker checks whether the contents of OWNER EUI register of the other portal are changed or not. A procedure in the check is as follows:

(1) A value stored in OWNER EUI register of the upper portal is read;
(2) The value is compared with the value of its own EUI, and if they are equal, the processing is continued and if not, the processing is stopped; and
(3) A value stored in its own MAX BUS ID register is written to MAX BUS ID register of the upper portal.

After the processing in the step S266, the processing proceeds to a step S267 wherein the processing terminates. In the meantime, in the step S268, setting operation itself stops and a result thereof is not informed.

Next, a procedure of bridge configuration will be described using a flowchart shown in FIG. 13.

As shown in FIG. 13, in a step S281, a request for bridge configuration is received and its operation is started. In a step S282, the setting of the other portal configuring the same bridge is started. A flowchart shown in FIG. 14 shows a procedure for setting the other portal in the step S282.

Figure 14:
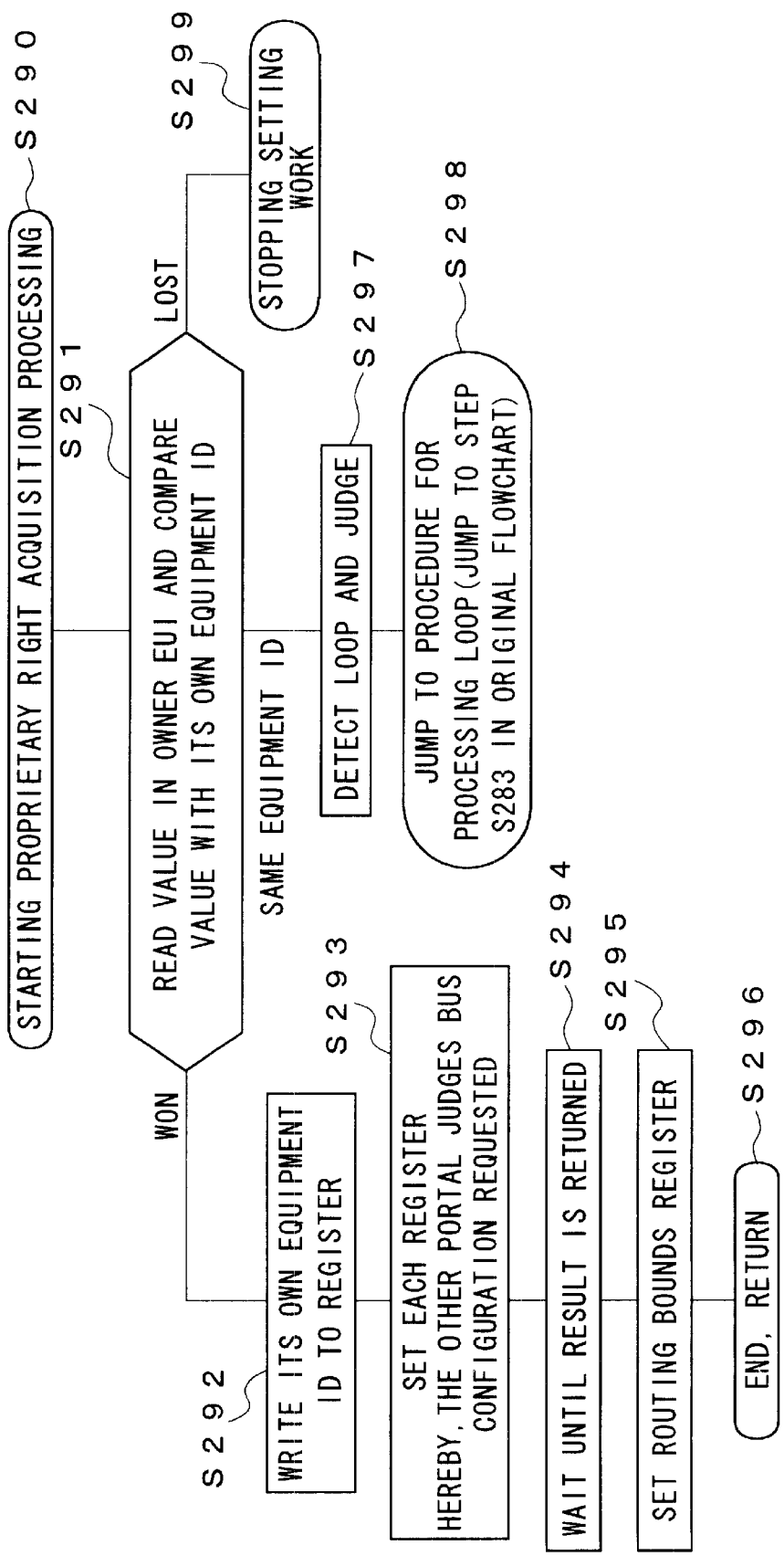
FIG. 14 is a flowchart showing a procedure of processing for setting a portal in the bridge configuration processing in the second bridge manager determining method.

As shown in FIG. 14, in a step S290, processing for acquiring a proprietary right is started. After the step S290, the processing proceeds to a step S291. In the step S291, a value (equipment ID) stored in OWNER EUI register is read and compared with equipment ID stored in its own OWNER EUI register. When its own equipment ID is stronger (wins), the processing proceeds to a step S292.

In the step S292, its own equipment ID is written to OWNER EUI register. Hereby, the proprietary right is acquired. In a step S293, each register of the portal is set. Concretely, 3 are written to "rte" field of PORTAL CONTROL register and the value of maximum bus ID is written to a lower bound register of ROUTING BOUNDS register. Next, registers are set as follows to request this portal to do bus configuration. That is, its own node ID is written to UPPER PORTAL ID register, a value stored in its own MAX BUS ID register is written to MAX BUS ID register, and the portal writes a value stored in its own MAX BUS ID register to the bus ID field of LOCAL BUS ID register.

Next, in a step S294, it waits until a value stored in its own MAX BUS ID register is updated. Afterward, in a step S295, a value stored in its own MAX BUS ID register is written to an upper bound field of ROUTING BOUNDS register. In a step S296, the processing is terminated and returned to the original processing.

When equipment IDs are equal in the step S291, the processing proceeds to a step S297. Equipment IDs are equal in case the network is looped and therefore, it is judged in the step S297 that the network is looped. In a step S298, the processing proceeds to a step S283 shown in FIG. 13.

When its own equipment ID is weaker (loses) in the step S291, the processing proceeds to a step S299. In the step S299, the setting stops.

After the processing in the step S282 shown in FIG. 13, in which the same procedure as that of the flowchart shown in FIG. 14 is executed, the processing proceeds to any processing in steps S283, S284 and S286 respectively shown in FIG. 13. In the step S283, a value in "rte" field of its own PORTAL CONTROL register is reset to zero (this is equivalent to disconnection between the portals).

In the step S284, a value written to the maximum bus ID field is written to MAX BUS ID register of the upper portal. Before that, it is checked whether the contents of OWNER EUI register of the other porter are changed or not. A procedure in this case is as follows:

(1) A value stored in OWNER EUI register of the upper portal is read;
(2) The value is compared with the value of its own EUI, and if they are equal, the processing is continued and if not, the processing is stopped; and
(3) Its own value is written to MAX BUS ID register of the upper portal.

In a step S285 after the processing in the step S284, the processing normally terminates. In the meantime, in the step S286, setting operation itself stops.

FIGS. 15A to 15F are illustrations for explaining an example of processing in the second bridge manager determining method in time series. This example is an example of processing in case two candidates for a bridge manager set in a network in which five bridges B1 to B5 exist.

As shown in FIG. 15A, B1 receives a request for bus configuration from high order equipment and informs B2 to B5 of a setting parameter (shown by a circular symbol). As shown in FIG. 15B, B1 starts the setting of B3. As shown in FIG. 15C, B2 receives a request for bridge configuration from high order equipment and compares a setting parameter (shown by a triangular symbol) informed from the high order equipment and the setting parameter informed from B1. As a result of comparison, the setting parameter shown by a triangular symbol is selected. In the meantime, B3 sets a low order bus using the setting parameter shown by a circular symbol. As shown in FIG. 15D, B2 informs B1, B3 to B5 of the setting parameter (shown by a triangular symbol). As shown in FIG. 15E, B2 starts the setting of B5. B3 is informed of a result of the setting by the low order bus. As shown in FIG. 15F, as B3 is already set by the high order equipment of B2, it does not process the result of the setting informed from the low order bus of B3 (does not inform B1 of the result).

As described above, one bridge manager is automatically selected based upon one parameter (equipment ID) stored in a portal out of plural candidates for a bridge manager by the first and second bridge manager determining methods.

Next, a case that a candidate for abridge manager provided with the above higher function is selected as a bridge manager will be described. To realize this, an index of a level is newly introduced and an area (BRIDGE MANAGER LEVEL register) for storing the level of a bridge manager that manages each portal is provided to each portal.

If two candidates for a bridge manager, for example, conflict with each other at the work of network configuration, first, the superiority or inferiority of the functions of the candidates for a bridge manager is determined by comparison in the above level and further, if the levels of these two candidates for a bridge manager are equal, a determining method such as either is selected using equipment ID having a unique value every candidate for a bridge manager is adopted.

Further, as it is not guaranteed that the values of two registers are written by one equipment even if the values are sequentially read in case pieces of equipment access to the two registers and then the exchange of right information may become impossible, this exchange of right information is enabled by newly providing a flag denoting an access right to a group of registers related to the setting to PORTAL CONTROL register.

To realize the above first and second bridge manager determining methods respectively (shown in FIGS. 3 and 4), registers for storing the following information are provided in RAM of a portal in the configuration shown in FIGS. 1 and 2.

That is, registers provided in RAM are as follows:

(1) A register for storing various information for controlling a portal (PORTAL CONTROL register);
(2) A register for storing the level of a bridge manager that sets the portal (BRIDGE MANAGER LEVEL register);
(3) A register for storing the equipment ID of the bridge manager that sets the portal (OWNER EUI register);
(4) A register for storing the routing of a packet (ROUTING BOUNDS register);
(5) A register for storing current maximum bus ID (MAX BUS ID register);
(6) A register for storing the bus ID of a bus to which the portal is connected (LOCAL BUS ID register); and
(7) A register for storing the node ID of a node that requests the portal to set (UPPER PORTAL ID register).

The above PORTAL CONTROL register and OWNER EUI register are the existing registers, however, the former newly defines an area for a busy flag (a busy field) in the inside thereof in this embodiment and the latter is a register is used the usage of which has been not described.

Though ROUTING BOUNDS register is also the existing register, it is used according to algorithm in this embodiment. Two values of an upper bound (UPPER_BOUND) and a lower bound (LOWER_BOUND) are stored in the ROUTING BOUNDS register.

The BRIDGE MANAGER LEVEL register stores the above level. MAX BUS ID register, LOCAL BUS ID register and UPPER PORTAL ID register are used for communication between portals in the second bridge manager determining method and are newly installed in this embodiment. They are not required in the first bridge manager determining method.

An example of the configuration of each register will be described below. In the following description, only a part required for explaining functions in this embodiment is described and the description of the other part is omitted.

Figure 16:
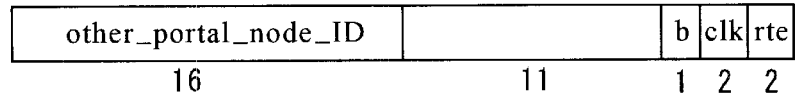
FIG. 16 is a representation showing a format of PORTAL CONTROL register.

FIG. 16 shows a format of PORTAL CONTROL register. As shown in FIG. 16, "b" denotes a busy field and the busy field controls access to a group of registers required in configuration. If a value in the busy field is 1 (a busy flag is on), writing to the OWNER EUI register, the BRIDGE MANAGER LEVEL register, the MAX BUS ID register, the UPPER PORTAL ID register and the LOCAL BUS ID register of the corresponding portal is prohibited and it is not guaranteed that a read value is right. An initial value in the busy field is 0.

Figure 17:
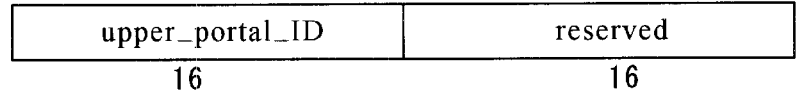
FIG. 17 is a representation showing a format of UPPER PORTAL ID register.

FIG. 17 shows a format of UPPER PORTAL ID register. As shown in FIG. 17, an upper portal ID (upper_portal_ID) field of the upper portal ID denotes a high order portal (that is, a portal requesting configuration). This is used as a destination to which maximum bus ID (MAX_BUS_ID) is returned when bus (orbridge) configuration is finished.

Figure 18:
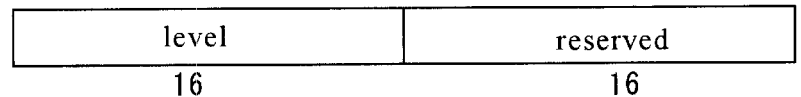
FIG. 18 is a representation showing a format of BRIDGE MANAGER LEVEL register.

FIG. 18 shows a format of BRIDGE MANAGER LEVEL register. As shown in FIG. 18, a level field denotes the function of a bridge manager. To solve the conflict, first, these are compared.

Figure 19:
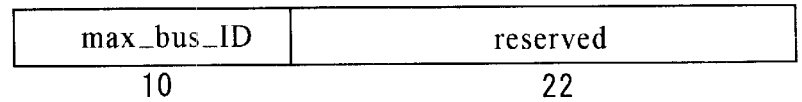
FIG. 19 is a representation showing a format of MAX BUS ID register.

FIG. 19 shows a format of MAX BUS ID register. As shown in FIG. 19, the corresponding MAX BUS ID register is used for exchanging maximum bus ID (MAX_BUS_ID). Writing to the register triggers the check of a list and the start of the setting of a portal during bus configuration and triggers the termination of bridge configuration during bridge configuration.

Figure 20:
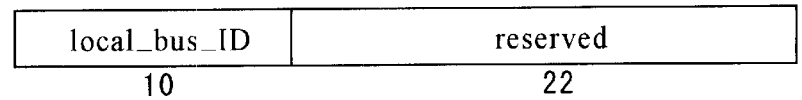
FIG. 20 is a representation showing a format of LOCAL BUS ID register.

FIG. 20 shows a format of LOCAL BUS ID register. As shown in FIG. 20, the corresponding LOCAL BUS ID register is used for a trigger of the start of bus configuration and bridge configuration. When writing is carried out to this area, bridge configuration is started in case a value in "rte" field of PORTAL CONTROL register is 2, while bus configuration is started in case a value in the "rte" field of PORTAL CONTROL register is 3.

Next, the level of a bridge manager will be described.

The level of a bridge manager means an index to give the criterion of integrated evaluation for the following function and processing speed to nodes provided with a function as a candidate for a bridge manager. For example, if the level of a bridge manager is represented by 16 bits, a function of the level is stored in high order 6 bits as following:

a level 1 denotes a basic network configuration function;

a level 2 denotes the level 1+ a network reconfiguration function;

a level 3 denotes the level 2+ an isochronous routing function,—. The processing speed and others are stored in low order 10 bits.

A bridge manager is currently provided with only a relatively simple function such as network configuration and bus reset processing. However, in future, a bridge manager may be provided with various functions such as a function for reconfiguring a network in consideration of the data transfer rate of respective buses and a function for routing an isochronous packet. It can be judged which of plural candidates for a bridge manager is suitable for a bridge manager by comparing the values of levels respectively stored in the above BRIDGE MANAGER LEVEL registers.

Next, operation when either of, for example, two candidates for a bridge manager is selected as a bridge manager by using the above levels will be described.

A case that two candidates for a bridge manager exist means a case that a portal to be set is already set by another equipment (a candidate for a bridge manager) (not an initial value but the equipment ID of another equipment is written to owner EUI).

For example, when a candidate for a bridge manager detects that a portal to be set is already set by another equipment (another candidate for a bridge manger), the candidate for a bridge manager first reads a value stored in BRIDGE MANAGER LEVEL register of the portal and compares it with a level stored in its own BRIDGE MANAGER LEVEL register. If superiority or inferiority cannot be judged as a result of the comparison (that is, if the levels are equal), the candidate for a bridge manager further reads a value stored in OWNER EUI register of the portal and compares it with equipment ID stored in its own OWNER EUI register.

However, as ID of a manufacturer is stored in the high order bits of equipment ID, superiority or inferiority is determined by IDs of manufacturers in case equipment IDs are simply compared. Therefore, when equipment IDs are compared, it is desirable that the values of equipment IDs are not simply compared but such methods that the side of the least significant bit (LSB) and the side of the most significant bit (MSB) respectively of equipment ID are exchanged (that is, the bit string of equipment ID is read from the reverse side), further, bits are inverted and bits in the bit string are shuffled according to a predefined method are used.

Next, flow when a network is actually configured will be described.

First, the flow of network configuration in a bridge manager concentralized network setting method such as a program run on a bridge manager sets all portals, that is, in the above first bridge manager determining method will be described below.

As rough flow in the first bridge manager determining method, first, a candidate for a bridge manager resets maximum bus ID (MAX_BUS_ID), which is an internal variable, to zero, next, starts the configuration of a bus to which the candidate is connected (bus configuration described later) and next, when the bus configuration is finished (at this time, the setting of all portals is finished), the candidate sets itself as a bridge manager. However, when the processing is terminated on the way of the bus configuration, the candidate is excluded from candidates for a bridge manager. If the candidate is set as a bridge manager as described above, it informs the whole network of its own node ID (NODE_ID) as the bridge manager and terminates its processing.

Figure 21:
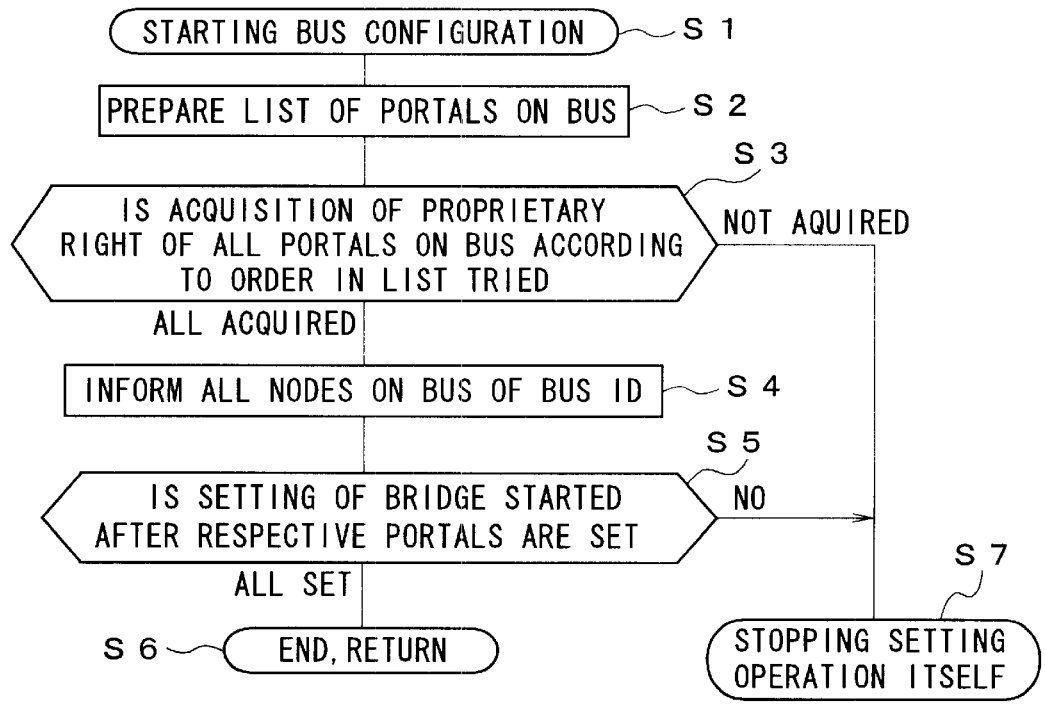
FIG. 21 is a flowchart showing a procedure of the bus configuration processing in the first bridge manager determining method.

A flowchart shown in FIG. 21 shows a procedure of the above bus configuration.

As shown in FIG. 21, in a step S1, bus configuration is started. In a step S2, a list of portals on a local bus to which the corresponding candidate for a bridge manager is connected is prepared and the portals are sorted in the order of equipment ID. The above list in the order of equipment ID is an example to fix order and a list can be also prepared in another order.

Next, in a step S3, the candidate for a bridge manager first tries to acquire the proprietary right of all portals on the local bus according to the order of the list. Operation for acquiring the proprietary right of portals by the candidate for a bridge manager in the step S3 is executed according to a procedure of a flowchart shown in FIG. 22.

Figure 22:
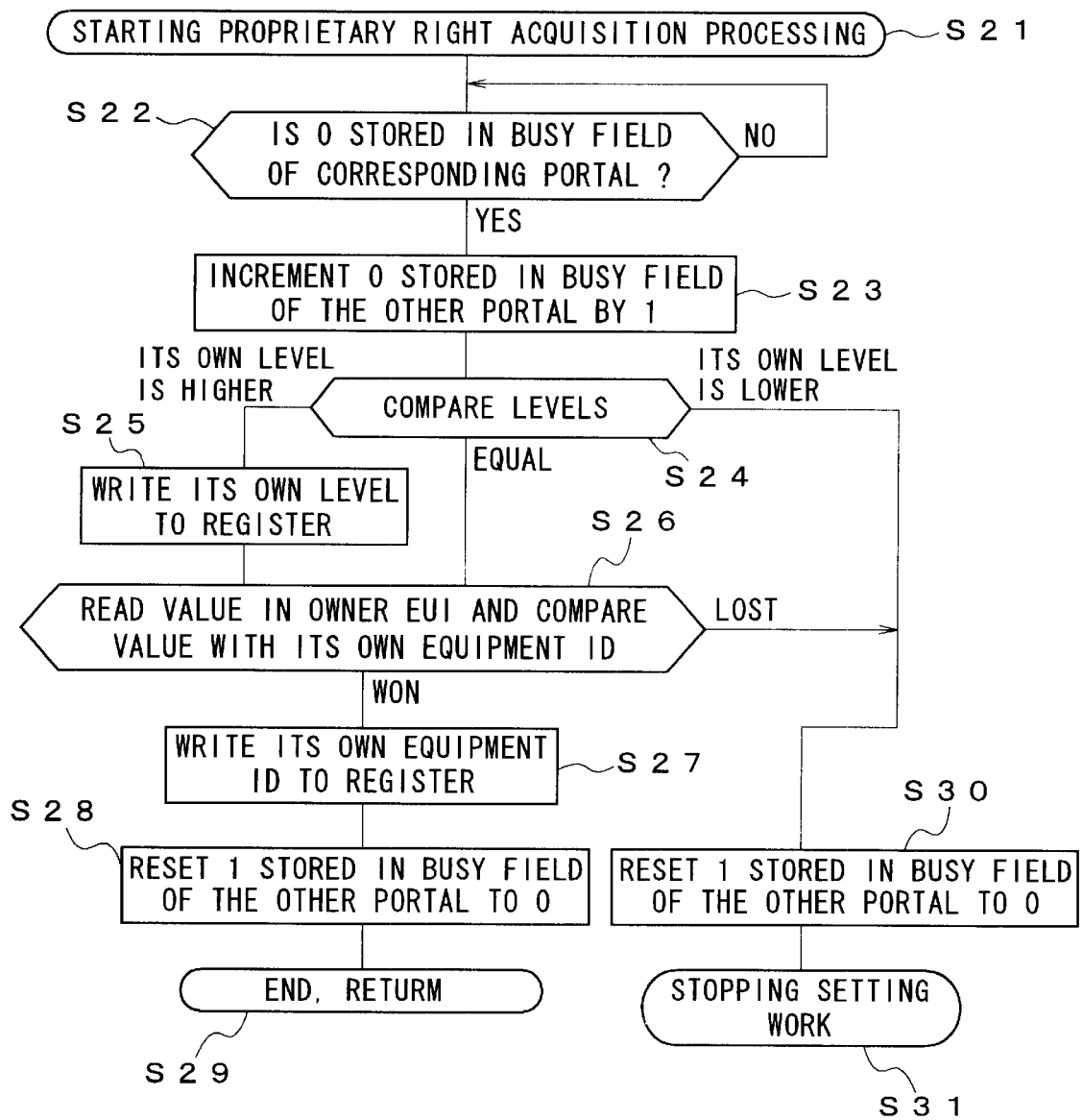
FIG. 22 is a flowchart showing a procedure of processing for obtaining the proprietary right of a portal in the bus configuration processing in the first bridge manager determining method.

As shown in FIG. 22, in a step S21, proprietary right acquisition processing is started. After the step S21, the processing proceeds to a step S23 via a step S22. In the step S22, a case that a value in a busy field of PORTAL CONTROL register of a portal to be acquired is 0 shows that no other equipment access to the portal. In the steps S22 and S23, "compare and swap" processing is repeated until '0' is successfully written to '1' using the "compare and swap" processing in the lock transaction in IEEE 1394 to enable access.

In a step S24, a value stored in BRIDGE MANAGER LEVEL register of the portal to be acquired is read and compared with a value stored in its own BRIDGE MANAGER LEVEL register. As a result of the comparison, when its own level is higher, the processing proceeds to a step S25; when the levels are equal, the processing proceeds to a step S26; and when the level thereof is lower, the processing proceeds to a step S30.

In the step S25, the candidate writes its own level to BRIDGE MANAGER LEVEL register of the portal to be acquired and the processing proceeds to the step S26. In the step S26, a value (equipment ID) stored in OWNER EUI register of the portal to be acquired is read and compared with equipment ID stored in its own OWNER EUI register. In the comparison, when its own equipment ID is stronger (wins), the processing proceeds to a step S27 and when its own equipment ID is weaker (loses), the processing proceeds to the step S30. In the step S26, equipment ID itself is not compared but it may be also determined which continues to set by a method such as reading bits in a bit string from the reverse side, the inversion and the shuffle of bits respectively described above.

In the step S27, its own equipment ID is written to OWNER EUI register of the portal. Hereby, the proprietary right of the portal is acquired. In a step S28, a value in a busy field of the acquired portal is reset to zero, an access right to the portal is released and in a step S29, the operation for acquiring the proprietary right normally terminates. In the meantime, in the step S30, a value in the busy field of the unacquired portal is reset to zero and an access right to the portal is released. Afterward, in a step S31, setting operation itself stops. Hereby, the candidate is excluded from candidates for a bridge manager.

After the processing in the step S3 shown in FIG. 21, in which the same procedure as that of the flowchart shown in FIG. 22 is executed, the processing proceeds to a step S4 shown in FIG. 21. In the step S4, a value of maximum bus ID is written to a bus ID field of each node ID register of all nodes. At this time, a broadcast in a write transaction in IEEE 1394 is used.

Next, in a step S5, the candidate for a bridge manager sets all portals in a list according to order in the list. Concretely, the above setting is executed according to a procedure in a flowchart shown in FIG. 23.

Figure 23:
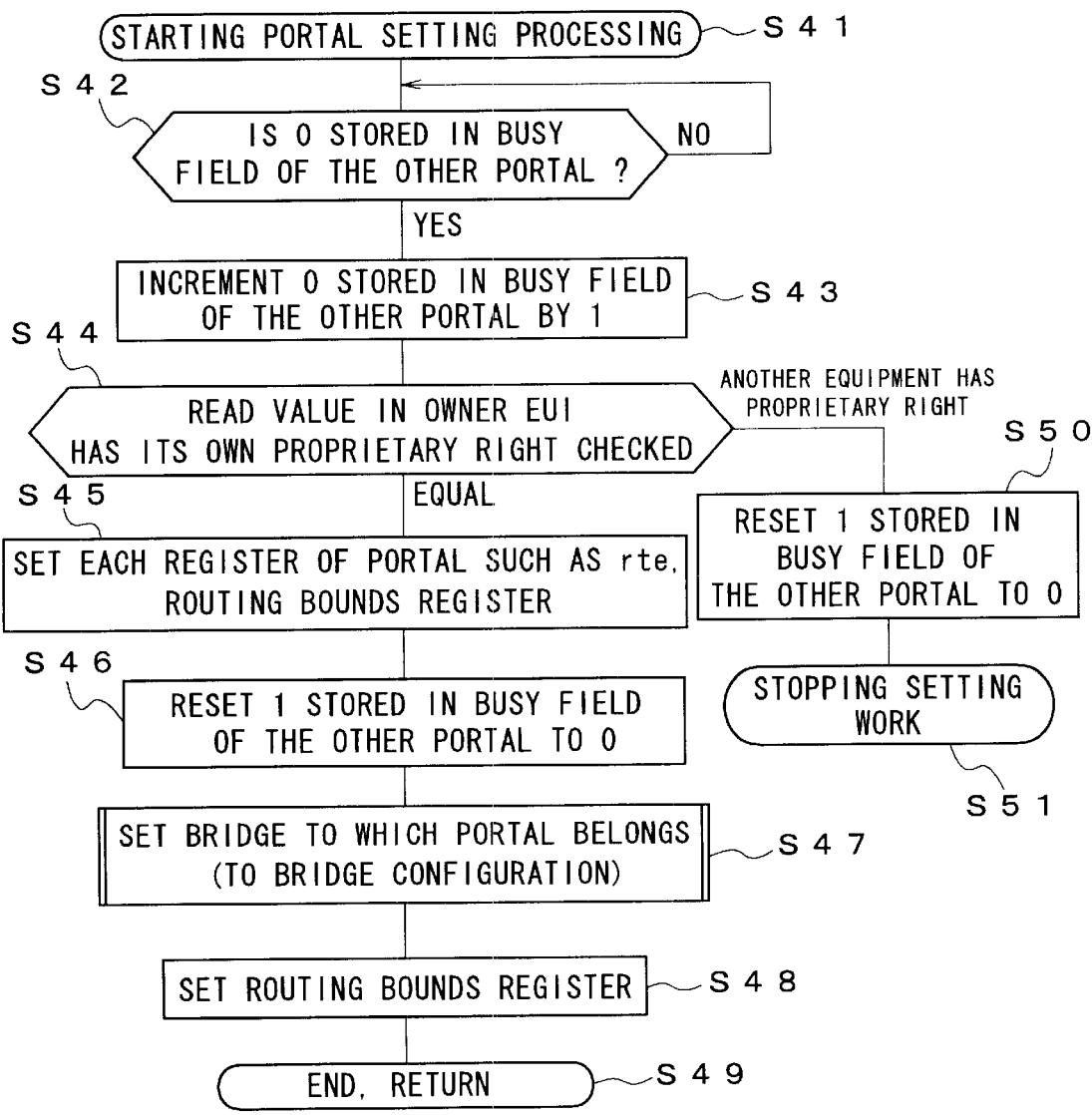
FIG. 23 is a flowchart showing a procedure of processing for setting a portal in the bus configuration processing in the first bridge manager determining method.

As shown in FIG. 23, in a step S41, portal setting processing is started. After the processing in the step S41, the processing proceeds a step S43 via a step S42. If a value in the busy field of PORTAL CONTROL register of a portal to be set is 0, it shows that no other equipment accesses to the portal. In the steps S42 and S43, the candidate repeats "compare and swap" processing until '0' is successfully written to '1' using the "compare and swap" processing in the lock transaction in IEEE 1394 to enable accessing to the portal.

Next, in a step S44, a value (equipment ID) stored in OWNER EUI register of the portal to be set is read and it checks whether the equipment ID is equal to equipment ID stored in its own OWNER EUI register or not. When the equipment IDs are equal in the step S44, the processing proceeds to a step S45 and when they are different, that is, when another equipment has the proprietary right of the portal, the processing proceeds to a step S50.

In the step S45, each register of the portal is set. A value of maximum bus ID, which is its own internal variable, is incremented by one and 2 are written to the "rte" field of PORTAL CONTROL register. Further, the information required when an IEEE-1394 network is configured, for example, a value of maximum bus ID (max_bus_ID) is written to the lower bound field of ROUTING BOUNDS register, is set.

In a step S46, after a value in the busy field of PORTAL CONTROL register of the set portal is reset to zero and an access right to the portal is released, the processing proceeds to a step S47. In the step S47, a bridge to which the set portal belongs is set. In that case, a procedure of bridge configuration described later is executed.

Next, in a step S48, a value of maximum bus ID is written to the upper bound field of ROUTING BOUNDS register and in a step S49, the setting processing of the portal terminates and the processing is returned to the original processing.

In the meantime, in a step S50, a value in the busy field of PORTAL CONTROL register of the portal the setting of which fails is reset to zero and an access right to the portal is released. Afterward, in a step S51, setting operation itself stops and the candidate is excluded from candidates for a bridge manager.

After the processing in the step S5 shown in FIG. 21, in which the same procedure as that of the flowchart shown in FIG. 23 is executed, the processing proceeds to a step S6 shown in FIG. 21. In the step S6, the bus configuration is normally completed.

When the proprietary right of all portals is not acquired in the step S3 or when all portals are not set in the step S5, the processing proceeds to a step S7 wherein the setting stops and the candidate is excluded from candidates for a bridge manager.

Next, referring to a flowchart shown in FIG. 24, a procedure of bridge configuration will be described.

Assume that a bridge includes two portals and either (in the following description, called a portal A) is already set. Therefore, as merely the unset portal has only to be set, the acquisition and the setting of its proprietary right are executed once.

Figure 24:
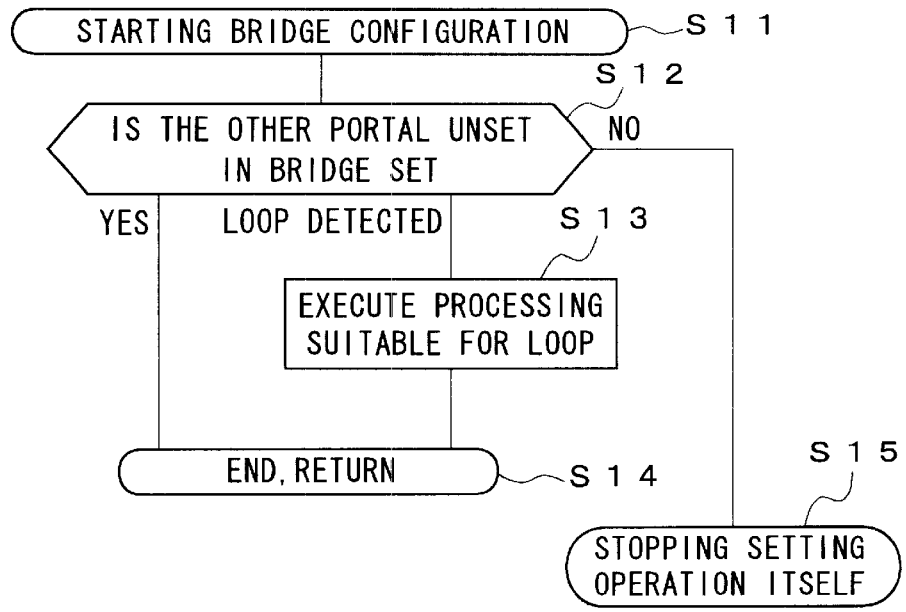
FIG. 24 is a flowchart showing a procedure of the bridge configuration processing in the first bridge manager determining method.

As shown in FIG. 24, in a step S11, the bridge configuration is started. After the step 11, the processing proceeds to a step S12. In the step S12, the setting of the other portal unset in the bridge is started. The step S12 is executed according to a procedure in a flowchart shown in FIG. 25.

Figure 25:
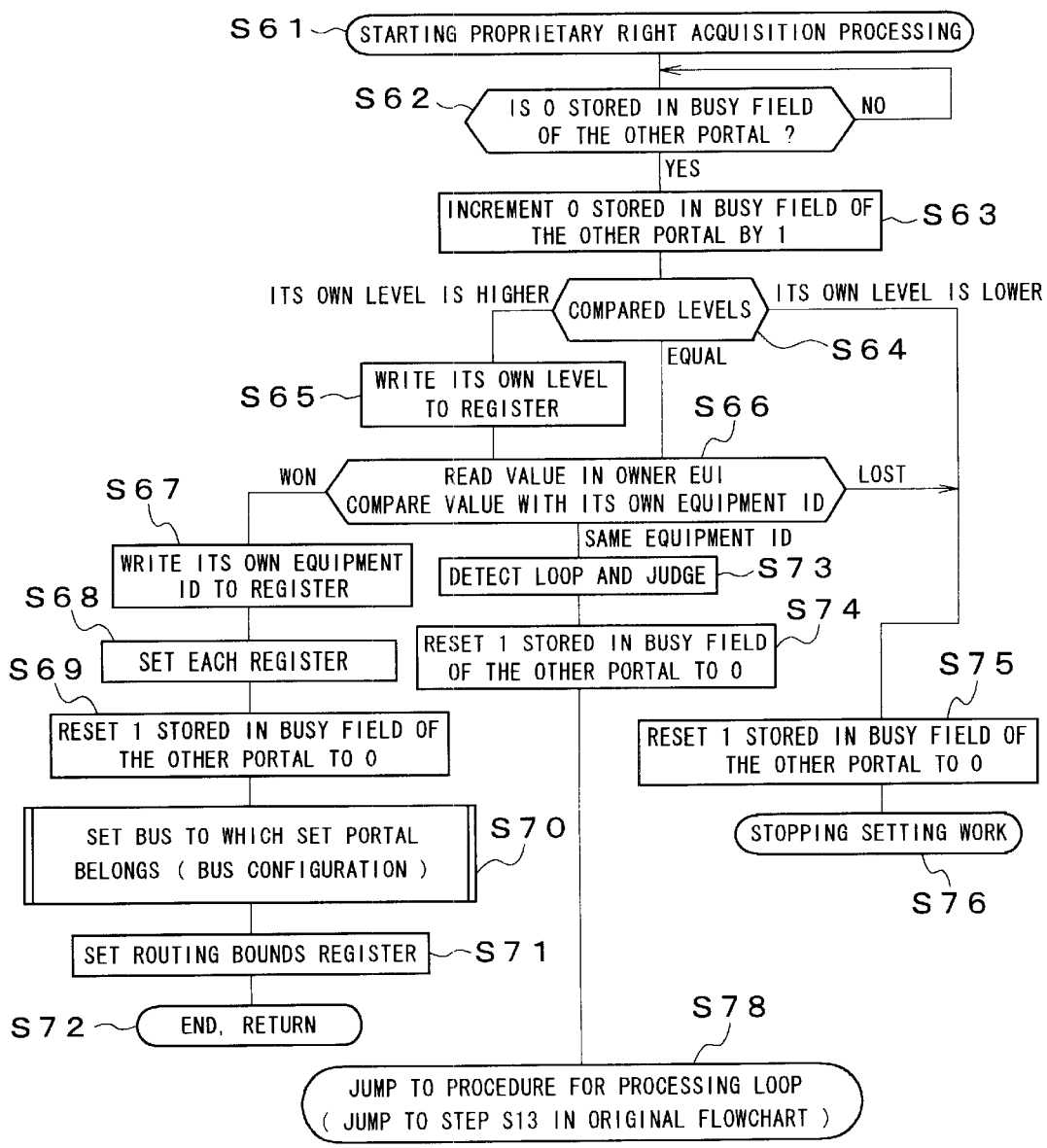
FIG. 25 is a flowchart showing a procedure of processing for setting a portal in the bridge configuration processing in the first bridge manager determining method.

As shown in FIG. 25, in a step S61, the acquisition of the proprietary right of the portal is started. After the step S61, the processing proceeds to a step S63 via a step S62. In the steps S62 and S63, "compare and swap" processing is repeated until '0' is successfully written to '1' in the busy field of PORTAL CONTROL register of the portal to be acquired using the "compare and swap" processing in the lock transaction in IEEE 1394.

Next, in a step S64, a value stored in BRIDGE MANAGER LEVEL register of the portal to be acquired is read and compared with a level in its own BRIDGE MANAGER LEVEL register. In the comparison in the step S64, when its own level is higher, the processing proceeds to a step S65; when their levels are equal, the processing proceeds to a step S66; and when its own level is lower, the processing proceeds to a step S75.

In the step S65, its own level is written to BRIDGE MANAGER LEVEL register of the portal to be acquired. After the processing in the step S65, the processing proceeds to the step S66. In the step S66, a value (equipment ID) stored in OWNER EUI register of the portal to be acquired is read and compared with equipment ID stored in its own OWNER EUI register. In the comparison, when its own equipment ID is stronger (wins), the processing proceeds to a step S67; when their equipment IDs are equal, the processing proceeds to a step S73; and when its own equipment ID is weaker (loses), the processing proceeds to the step S75. In the step S66, equipment IDs themselves are not compared but it may be also determined by the above methods which is to continue the setting.

In the step S67, its own equipment ID is written to OWNER EUI register. Hereby, the proprietary right of the portal is acquired. In a step S68, each register of the portal is set. That is, 3 are written to the "rte" field of PORTAL CONTROL register. Further, information required when an IEEE-1394 network is configured, for example, a value of maximum bus ID (max_bus_ID) is written to the lower bound field of ROUTINGBOUNDS register, is set.

Next, in a step S69, a value in a busy field of the acquired portal is reset to zero, an access right to the portal is released and afterward, the processing proceeds to a step S70. In the step S70, a bus to which the set portal belongs is set. In this case, a procedure of bus configuration is executed. Afterward, in a step S71, the value of maximum bus ID is written to the upper bound field of ROUTING BOUNDS register and in a step S72, the processing normally terminates.

In the meantime, a fact that equipment IDs are equal in the step S66 occurs in case the network is looped as described later and therefore, in a step S73, it is judged that the network is looped. In a step S74, a value in the busy field of the portal is reset to zero and an access right to the portal is leased. After the step S74, the processing proceeds to a step S13 shown in FIG. 24 via a step S78.

In the step S75, a value in the busy field of the unacquired portal is reset to zero and an access right to the portal is released. Afterward, in a step S76, the setting is stopped and the candidate is excluded from candidates for a bridge manager.

After the processing in the step S12 shown in FIG. 24, in which the same procedure as that of the flowchart shown in FIG. 25 is executed, the processing proceeds to any of steps S13, S14 and S15 shown in FIG. 24. In the step S13, a value in the "rte" field of PORTAL CONTROL register of the portal A already set is reset to zero (this is equivalent to disconnection between the portals). In the step S14, as the portal is set, the processing of bridge configuration terminates. In the meantime, in the step S15, setting operation itself stops.

Next, the flow of network configuration in the distributed network setting method in which each portal executes predetermined operation, that is, the second bridge manager determining method will be described.

As rough flow in the second bridge manager determining method, first, when a busy field is changed and each register is rewritten, a portal detects that a value, 1, in the busy field is reset to zero, checks the rewritten contents of each register based upon the detection, afterward, judges based upon the rewritten type and value of each register and a state of the portal itself and rewrites its own state.

A node provided with a function to be a bridge manager starts setting operation as follows:

(1) The node resets a value stored in its own MAX BUS ID register to zero;
(2) The node applies a procedure of bus configuration to a bus to which the node belongs;
(3) If the bus configuration is normally terminated, the node informs the whole network of its own node ID as ID of a bridge manager; and
(4) Afterward, the node terminates the setting operation.

A word of a request for setting a portal is used in the following two cases. That is, there are a request for bridge configuration and a request for bus configuration. A portal to which data is written by writing data to its determined registers judges what is requested and starts processing for the request.

Equipment requesting the portal to set waits until a result is returned from the portal. It is judged by rewriting MAX BUS ID register of the equipment by the portal whether the result is returned or not. A fact that the result is not returned means that setting is stopped in front of the portal requested the setting and the fact occurs in case a more suitable candidate as a bridge manager exists.

In the following description, the reason why its own busy flag is operated before a busy flag of the other portal to be set is set, is to prevent a register of the portal from being rewritten while the portal sets the other portal to be set and to prevent a state of the portal from being changed. The reason why such a procedure is required is that if a state of equipment which sets a busy flag of a portal to 1, for example, changes during reading or writing, the busy flag of the portal the busy flag of which is set remains 1 and then, the portal is never reset to zero.

Figure 26:
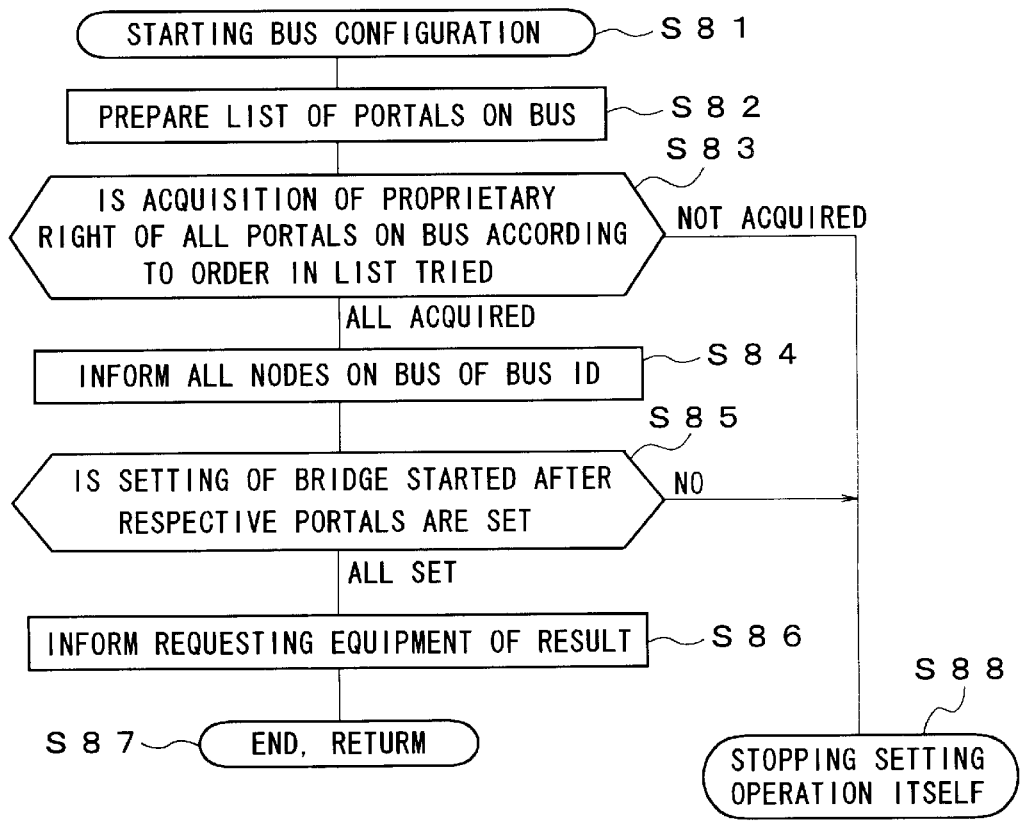
FIG. 26 is a flowchart showing a procedure of the bus configuration processing in the second bridge manager determining method.
Figure 28:
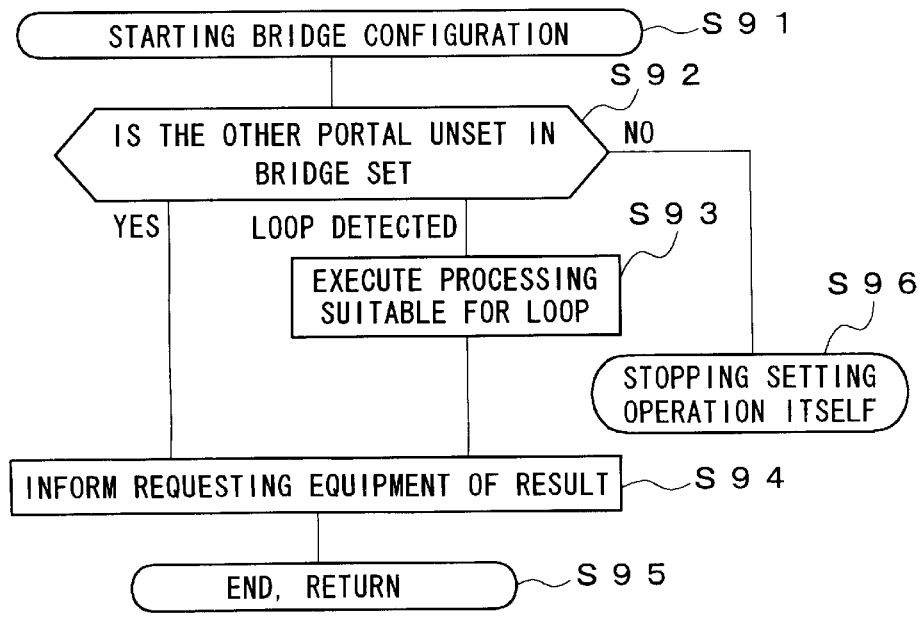
FIG. 28 is a flowchart showing a procedure of the bridge configuration processing in the second bridge manager determining method.

FIGS. 26 and 28 show each procedure of bus configuration and bridge configuration. Though the procedure is approximately the same as that in the first bridge manager determining method, the executors of setting operation are different.

A flowchart of bus configuration shown in FIG. 26 will be described below. In the following description, equipment (a portal) requested to set a bus is particularly called an invoker in this case to distinguish the equipment (the portal) from other portals.

As shown in FIG. 26, in a step S81, the setting of a bus is started. After the step S81, the processing proceeds to a step S82. In the step S82, the invoker prepares a list of portals on a local bus on which the invoker exists and sorts portals in the order of equipment ID. The list in the order of equipment ID is an example to fix order and a list may be also prepared in another order.

Next, in a step S83, the invoker first acquires the proprietary right of all portals according to the order in the list. At this time, the invoker executes for each portal the following sequence:

(1) The invoker increments a value in a busy field of its own PORTAL CONTROL register by 1;
(2) The invoker executes the similar method to the above first bridge manager determining method (executes the processing in the flowchart shown in FIG. 22); and (3) The invoker resets a value in its own busy field.

Next, in a step S84, the invoker broadcasts bus ID stored in LOCAL BUS ID register to the bus to which the invoker belongs.

Next, in a step S85, the invoker first reads a value in the bus ID field of its own LOCAL BUS ID register and writes the value to its own MAX BUS ID register. Hereby, the invoker sets each portal while checking the proprietary right in the order in the list once more.

Figure 27:
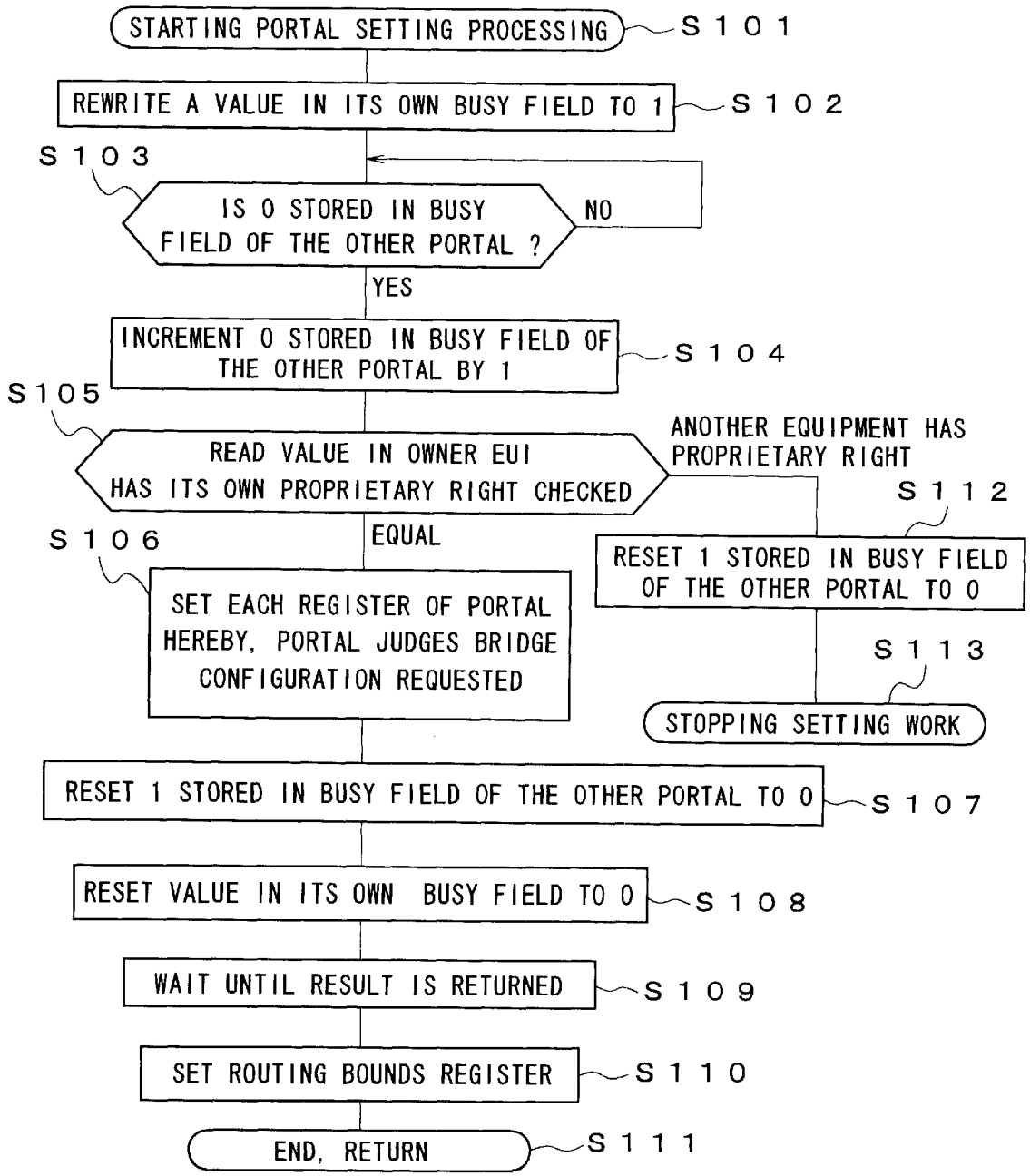
FIG. 27 is a flowchart showing a procedure of processing for setting a portal in the bus configuration processing in the second bridge manager determining method.

In the processing in the step S85, the invoker executes processing in a flowchart shown in FIG. 27 for each portal. As shown in FIG. 27, in a step S101, portal setting processing is started. After the processing in the step S101, the processing proceeds to a step S102. In the step S102, the invoker rewrites a value in its own busy field to 1.

After the step S102, the processing proceeds to a step S104 via a step S103. If a value in the busy field of PORTAL CONTROL register of a portal to be set is 0, it is known that no other equipment accesses to the portal. In steps S103 and S104, "compare and swap" processing is repeated until '0' is successfully rewritten to '1' using the "compare and swap" processing in the lock transaction in IEEE 1394 to enable the invoker to access.

Next, in a step S105, a value (equipment ID) stored in OWNER EUI register of a portal to be set is read and it is checked whether the value is equal to equipment ID stored in its own OWNER EUI register or not. In the step S105, when they are equal, the processing proceeds to a step S106 and when they are not equal, that is, when another equipment has the proprietary right of the portal to be set, the processing proceeds to a step S112.

In the step S106, registers of the portal are set. First, the information required in configuring an IEEE-1394 network is set. Concretely, 2 are written to the "rte" field of PORTAL CONTROL register and a value acquired by adding one to a value stored in its own MAX BUS ID register is written to the lower bound register of ROUTING BOUNDS resister. Next, to request the portal to do bridge configuration, the registers are set as follows. That is, its own node ID is written to UPPER PORTAL ID register, a value acquired by adding one to a value stored in its own MAX BUS ID register is written to MAX BUS ID register and bus ID of a bus to which the portal belongs is written to the bus ID field of LOCAL BUS ID register.

Next, in a step S107, a value in the busy field of PORTAL CONTROL register of the set portal is reset to zero, an access right to the portal is released and in the next step S108, a value in its own busy field is reset to zero. In a step S109, the invoker waits until a value stored in its own MAX BUS ID register is updated. Afterward, in a step S110, the value of maximum bus ID is written to the upper bound field of ROUTING BOUNDS register, and in a step S111, the processing terminates and returns to the original processing.

In the meantime, in the step S112, a value in the busy field of PORTAL CONTROL register of the portal the setting of which fails, is reset to zero and an access right to the portal is released. Afterward, in a step S113, setting operation itself stops.

In the processing in the step S85 shown in FIG. 26, in which the same procedure as that of the flowchart shown in FIG. 27 is executed, when the setting of all portals is completed, the processing proceeds to a step S86 shown in FIG. 26 and when the setting fails, the processing proceeds to a step S88 shown in FIG. 26.

In the step S86, the invoker reads upper portal ID from its own UPPER PORTAL ID register and writes the contents of its own MAX BUS ID register to MAX BUS ID register of an upper portal. However, before that, the invoker checks whether the contents of OWNER EUI register of the upper portal are changed or not. A procedure of the check is as follows:

(1) The invoker increments a value in its own busy field by 1;
(2) The invoker continues locks from 0 to 1 of the busy field of the upper portal till success;
(3) The invoker reads a value stored in OWNER EUI register of the upper portal;
(4) The invoker compares it with the value of its own EUI, if they are equal, continues the processing and if not, stops the processing;
(5) The invoker writes its own value to MAX BUS ID register of the upper portal;
(6) The invoker resets a value in a busy field of the other portal to zero;
(7) The invoker resets a value in its own busy field to zero After the processing in the step S86, the processing proceeds to a step S87 wherein the processing terminates.

In the meantime, when all portals are not acquired in the step S83 or when all portals are not set in the step S85, the processing proceeds to a step S88. In the step S88, setting operation itself is stopped and a result is also not informed.

Next, referring to a flowchart shown in FIG. 28, a procedure of bridge configuration will be described. As shown in FIG. 28, in a step S91, the invoker receives a request for bridge configuration and starts its operation. After the step S91, the processing proceeds to a step S92. In the step S92, the invoker starts the setting of the other portal configuring the same bridge. A flowchart shown in FIG. 29 shows a procedure of the setting of the other portal in the step S92.

As shown in FIG. 29, in a step S121, the processing for acquiring the proprietary right is started. After the step S121, the processing proceeds to a step S122. In the step S122, the invoker increments a value in its own busy field by 1. After the step S122, the processing proceeds to a step S124 via a step S123. In the steps S123 and S124, "compare and swap" processing is repeated until '0' in the busy field of PORTAL CONTROL register of a portal to be acquired is successfully rewritten to '1' using the "compare and swap" processing in the lock transaction in IEEE 1394.

Next, in a step S125, a value stored in BRIDGE MANAGER LEVEL register of the portal to be acquired is read and compared with a level in its own BRIDGE MANAGER LEVEL register. In the comparison in the step S125, when its own level is higher, the processing proceeds to a step S126; when their levels are equal, the processing proceeds to a step S127; and when its own level is lower, the processing proceeds to a step S139.

In the step S126, the invoker writes its own level to BRIDGE MANAGER LEVEL register of the portal to be acquired. After the processing in the step S126, the processing proceeds to a step S127. In the step S127, a value stored in OWNER EUI register of the portal to be acquired is read and compared with equipment ID stored in its own OWNER EUI register. In the comparison, when its own equipment ID is stronger (wins), the processing proceeds to a step S128; when it is equal to its own equipment ID, the processing proceeds to a step S135; and when its own equipment ID is weaker (loses), the processing proceeds to a step S139. In the step S127, equipment IDs themselves are not compared but it may be also determined by the above methods which is to continue setting.

In the step S128, the invoker writes its own equipment ID to OWNER EUI register. Hereby, the proprietary right is acquired. Next, in a step S129, registers of the portal are set. First, the information required when an IEEE-1394 network is configured is set. Concretely, 3 are written to the "rte" field of PORTAL CONTROL register and a value of maximum bus ID is written to the lower bound register of ROUTING BOUNDS register. Next, in order to request the portal to do the bus configuration, the invoker sets registers as follows. That is, its own node ID is written to UPPER PORTAL ID register, a value stored in its own MAX BUS ID register is written to MAX BUS ID register and the portal writes a value stored in its own MAX BUS ID register to the bus ID field of LOCAL BUS ID register.

Next, in a step S130, a value in a busy field of the acquired portal is reset to zero, an access right to the acquired portal is released and in a step S131, a value in its own busy field is reset to zero. In a step S132, the invoker waits until a value stored in its own MAX BUS ID register is updated. Afterward, in a step S133, the invoker writes a value stored in its own MAX BUS ID register to the upper bound field of ROUTING BOUNDS register, and in a step S134, the processing terminates and returns to the original processing.

In the meantime, a fact that equipment IDs are equal in the step S127 occurs in case the network is looped and therefore, in a step S135, it is judged that the network is looped. In a step S136, a value in a busy field of the portal is reset to zero, an access right to the portal is released and in a step S137, a value in its own busy field is reset to zero. After the processing in the step S137 is finished, the processing proceeds to a step S93 shown in FIG. 28 via a step S138.

In a step S139, a value in the busy field of the unacquired portal is reset to zero, an access right to the portal is released and in a step S140, a value in its own busy field is reset to zero. Afterward, in a step S141, the setting is stopped.

After the processing in the step S92 shown in FIG. 28, in which the same procedure as that of the flowchart shown in FIG. 29 is executed, the processing proceeds to any of steps S93, S94 and S96 respectively shown in FIG. 28. In the step S93, a value in the "rte" field of its own PORTAL CONTROL register is reset to zero (this is equivalent to disconnection between the portals).

In the step S94, the written value in a maximum bus ID field is written to MAX BUS ID register of the upper portal. Before that, the invoker checks whether the contents of OWNER EUI register of the upper portal are changed or not. A procedure in this case is as follows:

(1) The invoker increments a value in its own busy field by 1;
(2) The invoker continues locks from 0 to 1 of the busy field of the upper portal till success;
(3) The invoker reads a value stored in OWNER EUI register of the upper portal;
(4) The invoker compares it with the value of its own EUI, if they are equal, continues the processing and if not, stops the processing;
(5) The invoker writes a value stored in its own MAX BUS ID register to MAX BUS ID register of the upper portal;
(6) The invoker resets a value in a busy field of the other portal to zero;
(7) The invoker resets a value in its own busy field to zero.

In the step S95 after the processing in the step S94, the processing normally terminates. In the meantime, in the step S96, the setting operation itself stops.

As described above, the functions as a bridge manager can be compared by providing the register for storing a value denoting the function of the bridge manager managing the portal in the portal of the bridge, setting a flag denoting an access right to the group of registers to which information related to the setting of the bridge is written, accessing utilizing the above flag in case pieces of equipment access to the group of registers and further, enabling equipment provided with a uniquely high function to be finally selected utilizing the above when the candidate for the bridge manager configures the network, conflict between pieces of equipment can be also satisfactorily solved in case plural registers from/to which data is read or written to set portals exist and further, saidpieces of equipment try to rewrite the registers, and a candidate provided with the highest function is always selected as the bridge manager out of plural candidates for the bridge manager.

Program data for realizing the above processing in each flowchart, though it is not described above, can be provided by a disc-type record medium such as various optical discs and magnetic discs and a tape-type record medium, can be also provided using various telecommunication lines and said program data can be installed or downloaded in each node.

In the above embodiments, it is judged by comparing levels as a bridge manager and comparing setting parameters such as equipment ID when the levels are equal whether a candidate is selected as a bridge manager or not, however, a dynamically changing value may be also used in place of equipment ID or together with equipment ID. For the dynamically changing value, the proceeding information of setting such as a number of acquired buses, time since a candidate is selected as a bridge manager and others are conceivable. The time since a candidate is selected as a bridge manager can be used in case plural networks are connected and configure one network. If a dynamically changing value is used together with equipment ID, it is judged whether a candidate is selected as a bridge manager or not by comparing dynamically changing values when levels as a bridge manager are equal and further, comparing equipment IDs when the dynamically changing values are equal.

Also, in the above embodiments, as shown in FIG. 1, the case that two candidates for a bridge manager (bridge managing equipment) exist is described, however, naturally, the present invention can be also similarly applied to an IEEE-1394 serial bus network system in which three or more candidates for a bridge manager exist.

Also, in the above embodiments, the bridge is composed of two portals, however, a bridge composed of three or more portals (hereinafter called a bridge B) is also conceivable. In the case of the bridge B, bridge configuration processing shown in the flowchart in FIG. 8 is changed to that as shown in a flowchart in FIG. 30, for example.

Figure 30:
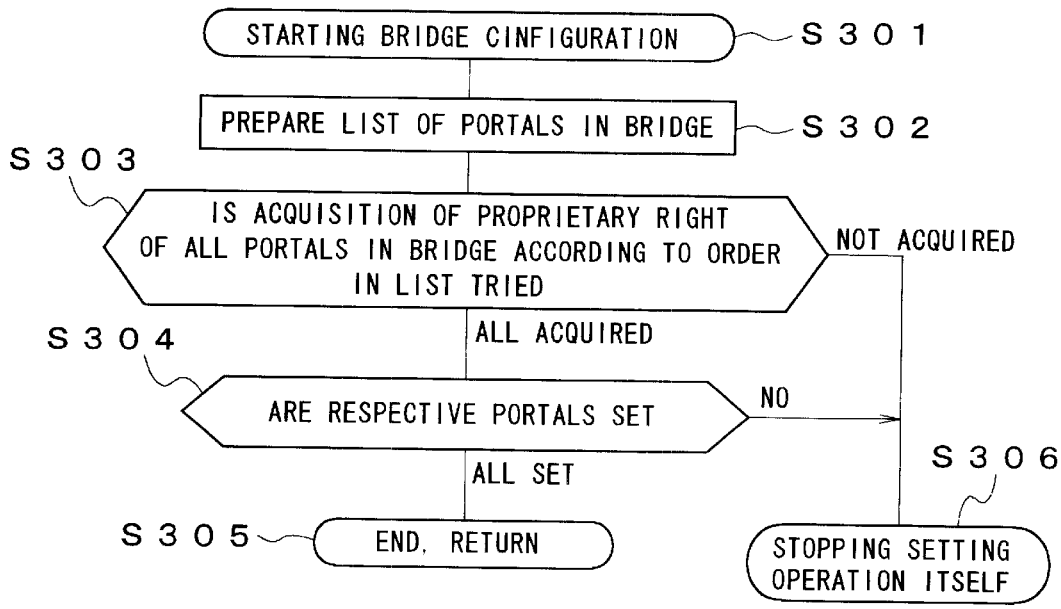
FIG. 30 is a flowchart showing a procedure of the bridge configuration processing (three or more portals) in the first bridge manager determining method.

As shown in FIG. 30, in a step S301, bridge configuration is started. After the step S301, the processing proceeds to a step S302. In the step S302, a list of portals in the corresponding bridge is prepared and the portals are sorted in the order of equipment ID. The list in the order of equipment ID is an example to fix order and a list may be also prepared in another order.

Next, in a step S303, a candidate for a bridge manager first tries to acquire the proprietary right of all portals according to the order in the list. Operation for acquiring the proprietary right of the portals is executed according to the above procedure in the flowchart shown in FIG. 6.

Next, in a step S304, the candidate for a bridge manager sets all portals in the list according to the order in the list. Concretely, the setting complies with, for example, the procedure in the flowchart shown in FIG. 7. However, the operation in the step S223 shown in FIG. 7 is replaced with the operation in the step S244 shown in FIG. 9.

When all portals are set in the step S304, the processing proceeds to a step S305 wherein the processing normally terminates. In the meantime, when the proprietary right of all portals is not acquired in the step S303 or when all portals are not set in the step S304, the processing proceeds to a step S306 wherein the setting operation itself stops.

Figure 31:
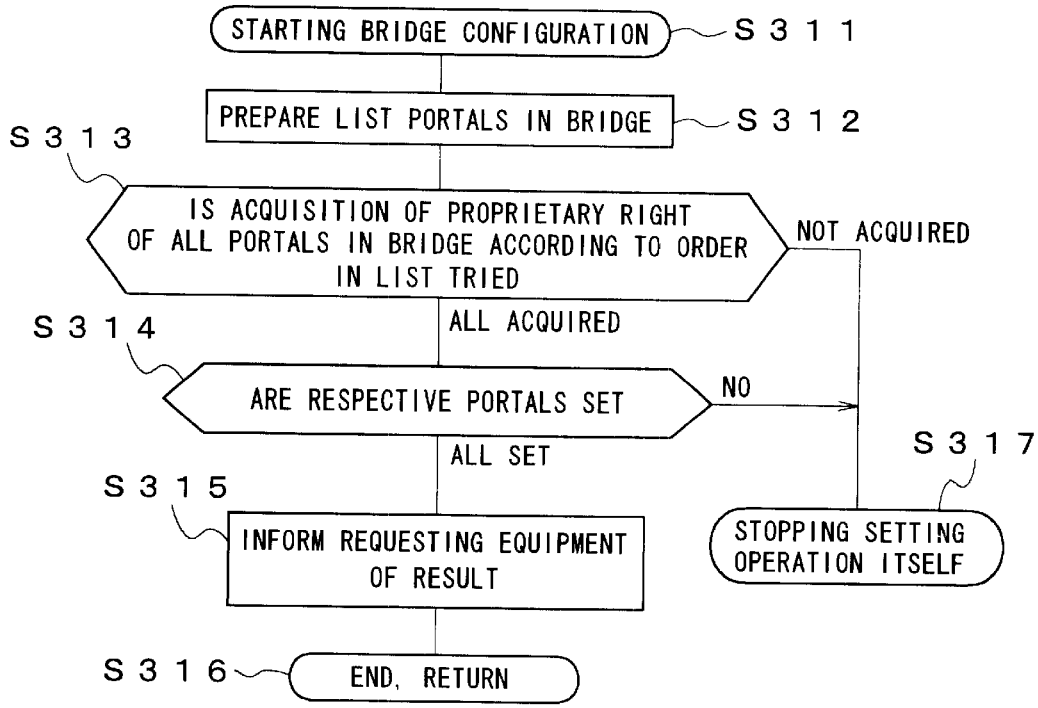
FIG. 31 is a flowchart showing a procedure of the bridge configuration processing (three or more portals) in the second bridge manager determining method.

In the case of the bridge B, bridge configuration processing in the flowchart shown in FIG. 13 is changed to, for example, that as shown in a flowchart in FIG. 31.

As shown in FIG. 31, in a step S311, bridge configuration is started. After the step S311, the processing proceeds to a step S312. In the step S312, a list of portals in the corresponding bridge is prepared and the portals are sorted in the order of equipment ID. The list in the order of equipment ID is an example to fix order and a list may be also prepared in another order.

Next, in a step S313, the acquisition of the proprietary right of all portals is first tried according to the order in the list. The operation for acquiring the proprietary right of the portals is executed according to the above procedure in the flowchart shown in FIG. 6.

Next, in a step S314, all portals in the list are set according to the order in the list. Concretely, the setting is executed according to, for example, the procedure in the flowchart shown in FIG. 12. However, the operation in the steps S273 and S275 shown in FIG. 12 is replaced with the operation in the steps S293 and S295 shown in FIG. 14.

When all portals are set in the step S314, upper portal ID is read from its own UPPER PORTAL ID register in a step S315 and the contents of its own MAX BUS ID register are written to MAX BUS ID register of an upper portal. Afterward, in a step S316, the processing normally terminates. In the meantime, when the proprietary right of all portals is not acquired in the step S313 or when all portals are not set in the step S314, the processing proceeds to a step S317 wherein the setting operation itself stops.

According to the present invention, a bridge manager can be automatically determined out of plural candidates for a bridge manager. Also, according to the present invention, in pieces of equipment as candidates for a bridge manager, various functions thereof are represented in a numeric value and can be compared. Further, the above equipment can be used even if the reading and writing of information in two different storage areas by the pieces of equipment conflict and further, equipment provided with more functions, equipment fast in processing speed and others can be preferentially selected when a bridge manager is determined.

INDUSTRIAL APPLICABILITY

As described above, the network configuration method, the information processing method, the information processing unit and the computer readable medium respectively according to the present invention can be suitably applied to the management of a network in which plural IEEE-1394 serial buses are illustratively connected.

What is claimed is:

1. A network configuration method for managing a network in which a bridge is configured by connecting devices to different buses and said buses are connected via said bridge, comprising the steps of:

storing information owned by bridge management equipment managing a device configuring said bridge;

selecting a piece of equipment from equipment that can manage said whole network as said bridge management equipment, based upon said information stored in said device configuring said bridge;

storing a flag denoting an access right to a group of registers storing information about said setting of said bridge; and controlling reading/writing by plural devices based upon said flag denoting said access right.

2. The network configuration method according to claim 1, wherein:

said stored information owned by said bridge management equipment is a setting parameter of said bridge management equipment.

3. The network configuration method according to claim 2, wherein:

said setting parameter of said bridge management equipment is equipment identification information.

4. The network configuration method according to claim 1, wherein:

information owned by said bridge management equipment is a value denoting a function of said bridge management equipment.

5. The network configuration method according to claim 1, wherein:

said information owned by said bridge management equipment is a dynamically changing value.

6. The network configuration method according to claim 5, wherein:

said dynamically changing value is information showing a proceeding of a setting of said network.

7. A network configuration method for managing a network in which a bridge is configured by connecting devices to different buses and said buses are connected via said bridge, comprising the steps of:

storing information owned by bridge management equipment managing a device configuring said bridge; and selecting a piece of equipment from equipment that can manage said whole network as said bridge management equipment, based upon said information stored in said device configuring said bridge, wherein said information owned by said bridge management equipment is a dynamically changing value, wherein said dynamically changing value in information showing time since a corresponding bridge management equipment is selected as said bridge management equipment.

8. The network configuration method according to claim 1, wherein:

each of said pieces of equipment which manage said whole network judges whether it becomes said bridge management equipment by comparing information in which said device configuration said bridge stores and its own information.

9. A network configuration method for managing a network in which a bridge is configured by connecting devices to different buses and said buses are connected via said bridge, comprising the steps of:

storing information owned by bridge management equipment managing a device configuring said bridge; and selecting a piece of equipment from equipment that can manage said whole network as said bridge management equipment, based upon said information stored in said device configuring said bridge, wherein each of said pieces of equipment which manage said whole network judges whether it becomes said bridge management equipment by comparing information in which said device configuration said bridge stores and its own information, wherein:

information owned by said bridge management equipment is a setting parameter of said bridge management equipment and a value denoting a function of said bridges management equipment;

it is determined whether it is selected as said bridge management equipment by comparing said value denoting said function which said device configuring said bridge stores and its own value denoting said function; and when said two values denoting said function are equal, it is determined whether it is selected as said bridge management equipment or not by comparing said setting parameter which said device configuring said bridge stores and its own setting parameter.

10. A network configuration method for managing a network in which a bridge is configured by connecting devices to different buses and said buses are connected via said bridge, comprising the steps of:

storing information owned by bridge management equipment managing a device configuring said bridge; and selecting a piece of equipment from equipment that can manage said whole network as said bridge management equipment, based upon said information stored in said device configuring said bridge, wherein each of said pieces of equipment which manage said whole network judges whether it becomes said bridge management equipment by comparing information in which said device configuration said bridge stores and its own information, wherein:

information owned by said bridge management equipment is said value denoting said function of said bridge management equipment and said dynamically changing value;

it is determined whether it is selected as bridge management equipment by comparing a value denoting said function which said device configuring said bridge stores and its own value denoting said function; and when said two values denoting said function are equal, it is determined whether it is selected as said bridge management equipment by comparing said dynamically changing value which said device configuring said bridge stores and its own dynamically changing value.

11. A network configuration method for managing a network in which a bridge is configured by connecting devices to different buses and said buses are connected via said bridge, comprising the steps of:

storing information own ed by bridge management equipment managing a device configuring said bridge; and selecting a piece of equipment from equipment that can manage said whole network as said bridge management equipment, based upon said information stored in said device configuring said bridge, wherein each of said pieces of equipment which manage said whole network judges whether it becomes said bridge management equipment by comparing information in which said device configuration said bridge stores and its own information, wherein:

information owned by said bridge management equipment is said setting parameter of said bridge management equipment, said value denoting said function of said bridge management equipment and said dynamically changing value;

it is determined whether it is selected as said bridge management equipment by comparing said value denoting said function which said device configuring said bridge stores and its own value denoting said function;

when said two values denoting said function are equal, it is determined whether it is selected as said bridge management equipment by comparing said dynamically changing value which said device configuring said bridge stores and its own dynamically changing value; and when said two dynamically changing value are equal, it is determined whether it is selected as said bridge management equipment or not by comparing said setting parameter which said device configuring said bridge stores and its own setting parameter.

12. A network configuration method for managing a network in which a bridge is configured by connecting devices to different buses and said buses are connected via said bridge, comprising the steps of:

storing information owned by bridge management equipment managing a device configuring said bridge; and selecting a piece of equipment from equipment that can manage said whole network as said bridge management equipment, based upon said information stored in said device configuring said bridge, wherein each of said pieces of equipment which manage said whole network judges whether it becomes said bridge management equipment by comparing information in which said device configuration said bridge stores and its own information, wherein:

said pieces of equipment which manage said whole network respectively configure said network while setting said pieces of equipment configuring all bridges; and it is determined whether it is selected as said bridge management equipment by comparing information which said device configuring said bridge stores and its own information.

13. A network configuration method for managing a network in which a bridge is configured by connecting devices to different buses and said buses are connected via said bridge, comprising the steps of:

storing information owned by bridge management equipment managing a device configuring said bridge; and selecting a piece of equipment from equipment that can manage said whole network as said bridge management equipment, based upon said information stored in said device configuring said bridge, wherein each of said pieces of equipment which manage said whole network judges whether it becomes said bridge management equipment by comparing information in which said device configuration said bridge stores and its own information, wherein:

said pieces of equipment which manage said whole network respectively request said device configuring said bridge connected to said bus to which said equipment belongs, to configure said network in front thereof; and it is determined whether it is selected as said bridge management equipment by comparing information which said device configuring said bridge stores and its own information.

14. An information processing method of an information processing unit provided with functions which manage a network in which a bridge is configured by respectively connecting devices to different buses and said different buses are connected via said bridge, comprising:

providing said information processing method with a processing step for determining whether it is selected as bridge management equipment based upon a result of a comparison between information which said device configuring said bridge stores, said information being owned by said bridge management equipment managing said device, and its own information wherein:

said information owned by said bridge management equipment is a dynamically changing value, and wherein said dynamically changing value is information showing time since a corresponding bridge management equipment is selected as said bridge management equipment.

15. The information processing method according to claim 14, wherein:

said information owned by said bridge management equipment is a setting parameter of said bridge management equipment.

16. The information processing method according to claim 15, wherein:

said setting parameter is equipment identification information.

17. The information processing method according to claim 14, wherein:

said information owned by said bridge management equipment is a value denoting a function of said bridge management equipment.

18. The information processing method according to claim 14, wherein:

said dynamically changing value is information showing processing of said setting of said network.

19. An information processing method of an information processing unit provided with functions which manage a network in which a bridge is configured by respectively connecting devices to different buses and said different buses are connected via said bridge, comprising:

providing said information processing method with a processing step for determining whether it is selected as bridge management equipment based upon a result of a comparison between information which said device configuring said bridge stores, said information being owned by said bridge management equipment managing said device, and its own information, wherein:

said information owned by said bridge management equipment is said setting parameter of said bridge management equipment and said value denoting said function of said bridge management equipment;

it is determined whether it is selected as said bridge management equipment by comparing said value denoting said function which said device configuring said bridge stores and its own value denoting said function; and when said two values denoting said function are equal, it is determined whether it is selected as said bridge management equipment by comparing said setting parameter which said device configuring said bridge stores and its own setting parameter.

20. An information processing method of an information processing unit provided with functions which manage a network in which a bridge is configured by respectively connecting devices to different buses and said different buses are connected via said bridge, comprising:

providing said information processing method with a processing step for determining whether it is selected as bridge management equipment based upon a result of a comparison between information which said device configuring said bridge stores, said information being owned by said bridge management equipment managing said device, and its own information, wherein:

said information owned by said bridge management equipment is a value denoting said function of said bridge management equipment and said dynamically changing value;

it is determined whether it is selected as said bridge management equipment by comparing said value denoting said function which said device configuring said bridge stores and its own value denoting said function; and when said two values denoting said function are equal, it is determined whether it is selected as said bridge management equipment by comparing said dynamically changing value which said device configuring said bridge stores and its own dynamically changing value.

21. An information processing method of an information processing unit provided with functions which manage a network in which a bridge is configured by respectively connecting devices to different buses and said different buses are connected via said bridge, comprising:

providing said information processing method with a processing step for determining whether it is selected as bridge management equipment based upon a result of a comparison between information which said device configuring said bridge stores, said information being owned by said bridge management equipment managing said device, and its own information, wherein:

said information owned by said bridge management equipment is said setting parameter of said bridge management equipment, said value denoting said function of said bridge management equipment and said dynamically changing value;

it is determined whether it is selected as said bridge management equipment by comparing said value denoting said function which said device configuring said bridge stores and its own value denoting said function;

when said two values denoting said function are equal, it is determined whether it is selected as said bridge management equipment by comparing said dynamically changing value which said device configuring said bridge stores and its own dynamically changing value; and when said two dynamically changing values are equal, it is determined whether it is selected as said bridge management equipment by comparing said setting parameter which said device configuring said bridge stores and its own setting parameter.

22. An information processing method of an information processing unit provided with a function as a bridge for connecting different buses, comprising:

providing an information processing method with a storing step for storing information owned by bridge management equipment for managing said bridge, wherein said information owned by said bridge management equipment is a dynamically changing value, and wherein said dynamically changing value is information showing time since a corresponding bridge management equipment is selected as said bridge management equipment.

23. The information processing method according to claim 22, wherein:

said information owned by said bridge management equipment is a set ting parameter of said bridge management equipment.

24. The information processing method according to claim 23, wherein:

said setting parameter is equipment identification information.

25. The information processing method according to claim 22, wherein:
said information owned by said bridge management equipment is a value denoting a function of said bridge management equipment.

26. The information processing method according to claim 22, wherein:
said dynamically changing value is information denoting the proceeding of said setting parameter of said network.

27. An information processing unit provided with functions which manage a network in which a bridge is configured by connecting devices to different buses and said different buses are connected via said bridge, comprising:
providing said information processing unit with processing means for determining whether it is selected as bridge management equipment based upon a result of a comparison between information which said device configuring said bridge stores, said information being owned by said bridge management equipment managing said device, and its own information, wherein
said information owned by said bridge management equipment is a dynamically changing value, and wherein
said dynamically changing value is information showing time since a corresponding bridge management equipment is selected as said bridge management equipment.

28. The information processing unit according to claim 27, wherein:
said information owned by said bridge management equipment is a setting parameter of said bridge management equipment.

29. The information processing unit according to claim 28, wherein:
said setting parameter is equipment identification information.

30. The information processing unit according to claim 27, wherein:
said information owned by said bridge management equipment is a value denoting a function of said bridge management equipment.

31. The information processing unit according to claim 27, wherein:
said dynamically changing value is information denoting a proceeding of a setting of said network.

32. An information processing unit according to claim 27, provided with functions which manage a network in which a bridge is configured by connecting devices to different buses and said different buses are connected via said bridge, comprising:
providing said information processing unit with processing means for determining whether it is selected as bridge management equipment based upon a result of a comparison between information which said device configuring said bridge stores, said information being owned by said bridge management equipment managing said device, and its own information, wherein:
said information owned by said bridge management equipment is said setting parameter of said bridge management equipment and said value denoting said function of said bridge management equipment; and
said processing means determines whether equipment itself is selected as said b ridge management equipment by comparing said value denoting said function which said device configuring said bridge stores and its own value denoting said function, and determines whether said equipment is selected as said bridge management equipment by comparing said setting parameter which said device configuring said bridge stores and its own setting parameter when said two values denoting function are equal.

33. An information processing unit provided with functions which manage a network in which a bridge is configured by connecting devices to different buses and said different buses are connected via said bridge, comprising:
providing said information processing unit with processing means for determining whether it is selected as bridge management equipment based upon a result of a comparison between information which said device configuring said bridge stores, said information being owned by said bridge management equipment managing said device, and its own information, wherein:
said information owned by said bridge management equipment is said value denoting said function of said bridge management equipment and said dynamically changing value; and
said processing means determines whether said equipment itself is selected as said bridge management equipment by comparing said value denoting said function which said device configuring said bridge stores and its own value denoting said function, and determines whether said equipment itself is selected as said bridge management equipment by comparing said dynamically changing value which said device configuring said bridge stores and its own dynamically changing value when said two values denoting said function are equal.

34. An information processing unit provided with functions which manage a network in which a bridge is configured by connecting devices to different buses and said different buses are connected via said bridge, comprising:
providing said information processing unit with processing means for determining whether it is selected as bridge management equipment based upon a result of a comparison between information which said device configuring said bridge stores, said information being owned by said bridge management equipment managing said device, and its own information, wherein:
said information owned by said bridge management equipment is said setting parameter of said bridge management equipment, said value denoting said function of said bridge management equipment and a dynamically changing value; and
said processing means judges whether said equipment itself is selected as said bridge management equipment by comparing said value denoting said function which said device configuring said bridge stores and its own value denoting said function, determines whether said equipment itself is selected as said bridge management equipment by comparing said dynamically changing value which said device configuring said bridge stores and its own dynamically changing value when said two values denoting said function are equal, and determines whether said equipment itself is selected as said bridge management equipment by comparing said setting parameter which said device configuring said bridge stores and its own setting parameter when said two dynamically changing values are equal.

35. An information processing unit provided with a function as a bridge for connecting different buses, comprising:

a setting parameter of said bridge management equipment; and storage means provided in said information processing unit for storing information owned by bridge management equipment managing said bridge, wherein
said information owned by said bridge management equipment is a dynamically changing value, and wherein
said dynamically changing value is information showing time since a corresponding bridge management equipment is selected as said bridge management equipment.

36. The information processing unit according to claim 35, wherein:
said information owned by said bridge management equipment is the setting parameter of said bridge management equipment.

37. The information processing unit according to claim 36, wherein:
said setting parameter is equipment identification information.

38. The information processing unit according to claim 35, wherein:
said information owned by said bridge management equipment is a value denoting a function of said bridge management equipment.

39. Information processing unit according to claim 35, wherein:
said dynamically changing value is information denoting a proceeding of said setting of said network.

* * * * *